(12) United States Patent
Ruscher et al.

(10) Patent No.: US 12,327,157 B2
(45) Date of Patent: Jun. 10, 2025

(54) TECHNIQUES FOR MANAGING PHYSICAL CARDS STORED IN A PHYSICAL WALLET

(71) Applicant: Apple Inc., Cupertino, CA (US)

(72) Inventors: Joel N. Ruscher, Fremont, CA (US);
Amrith V. Ram, Los Gatos, CA (US);
James E. Orr, Cupertino, CA (US);
Travis J. McQueen, Lee, NH (US);
Jack Erdozain, Jr., Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/471,268

(22) Filed: Sep. 20, 2023

(65) Prior Publication Data

US 2024/0127011 A1    Apr. 18, 2024

Related U.S. Application Data

(60) Provisional application No. 63/376,775, filed on Sep. 22, 2022.

(51) Int. Cl.
*G06K 7/10* (2006.01)

(52) U.S. Cl.
CPC .............................. *G06K 7/10297* (2013.01)

(58) Field of Classification Search
CPC .................................................. G06K 7/10297
See application file for complete search history.

(56) References Cited

U.S. PATENT DOCUMENTS

| 6,400,270 | B1 * | 6/2002 | Person | A45C 11/184 |
| | | | | 340/687 |
| 9,622,555 | B2 * | 4/2017 | Kopel | A45C 1/06 |
| 2019/0102529 | A1 * | 4/2019 | Vissa | G06F 21/6218 |

FOREIGN PATENT DOCUMENTS

WO    WO9104689    *  4/1991

\* cited by examiner

*Primary Examiner* — Sonji N Johnson
(74) *Attorney, Agent, or Firm* — DICKINSON WRIGHT RLLP

(57) ABSTRACT

This Application sets forth techniques for managing (e.g., tracking or detecting the presence or absence of) physical cards stored in a physical wallet. In particular, the techniques set forth a smart wallet configured to detect the physical cards stored therein, as well as a smart card configured to be inserted into a traditional wallet and to detect the physical cards stored therein. The smart wallet/smart card can be configured to, upon detecting a change to physical cards stored in the smart wallet/traditional wallet, gather information associated with the physical cards and store the information into a memory of the smart wallet/smart card. The smart wallet/smart card can, upon being communicably coupled to a wireless device, transmit the information to the wireless device. Subsequently, the wireless device can output a notification indicating any missing physical cards as well as provide remedial options.

20 Claims, 18 Drawing Sheets

Step 411 – The wireless device determines that a threshold amount of time has lapsed and the Physical Card #2 is still missing

TECHNIQUES FOR MANAGING PHYSICAL CARDS STORED IN A PHYSICAL WALLET

CROSS-REFERENCE TO RELATED APPLICATIONS

The present application claims the benefit of U.S. Provisional Application No. 63/376,775, entitled "TECHNIQUES FOR TRACKING PHYSICAL CARDS STORED IN A PHYSICAL WALLET," filed Sep. 22, 2022, the content of which is incorporated by reference herein in its entirety for all purposes.

FIELD

The described embodiments set forth techniques for managing (e.g., tracking or detecting the presence or absence of) physical cards (e.g., identification cards, credit cards, etc.) stored in a physical wallet. In particular, the embodiments set forth both (1) a smart wallet configured to manage the physical cards stored therein, as well as (2) a smart card configured to be inserted into a traditional wallet and to manage the physical cards stored therein.

BACKGROUND

Recent years have shown a proliferation of available accessory component options for wireless devices. Such accessory components include, for example, wearable devices (smart watches, wireless headphones, fitness trackers, etc.), protective cases, charging systems, and the like. In some cases, the physical locations of accessory components can be tracked with degrees of accuracy that vary based on the hardware and/or software capabilities of the accessory components. For example, the current and precise location of a smart watch can typically be obtained when the smart watch remains powered on and is equipped with global positioning system (GPS) and cellular components. In an alternative example, only a historic location of a particular set of headphones (that each lack GPS/cellular components) can be obtained based on a last known location of the headphones recorded by a wireless device to which they were previously paired.

Recently, physical wallets that are attachable to and removable from wireless devices have been growing in popularity. In some cases, the physical wallets include arrays of magnets that are shaped to match magnetic arrays included in the wireless devices. Under this approach, the magnetic wallets provide a considerable level of convenience in that users can quickly access their most-used physical cards (e.g., a driver's license and two credit cards) simply by reaching for their wireless devices and detaching their magnetic wallets. Users are also more likely to notice that their magnetic wallets are missing given the frequency by which they typically reach for their wireless devices.

Despite the foregoing advantages, these magnetic wallets continue to suffer from drawbacks that have yet to be addressed. For example, a user may fail to reattach their magnetic wallet to their wireless device and ultimately forget where it was placed. In another example, a user may remove a physical card from their magnetic wallet and forget to return the physical card to their magnetic wallet after the physical card is used. This scenario arises all too often when a given user accidentally leaves their credit card sitting in a check tray at a restaurant, in an ATM machine after they have withdrawn cash, and the like. Additionally, the foregoing issues are typically exacerbated when traditional wallets are used, given their infrequent access (relative to the aforementioned magnetic wallets) delays the discovery of missing physical cards.

Accordingly, there exists a need for a technique for managing (e.g., tracking or detecting the presence or absence of) physical cards that are placed into physical wallets.

SUMMARY

This Application sets forth techniques for managing (e.g., tracking or detecting the presence or absence of) physical cards (e.g., identification cards, credit cards, etc.) stored in a physical wallet. In particular, the embodiments set forth both (1) a smart wallet configured to manage the physical cards stored therein, and (2) a smart card configured to be inserted into a traditional wallet and to manage the physical cards stored therein.

One embodiment sets forth a method implemented by a smart wallet for managing physical cards stored therein. According to some embodiments, the method includes the steps of (1) detecting a change to one or more physical cards stored in the smart wallet, (2) gathering, using at least one communications component of the smart wallet, information associated with one or more physical cards stored in the smart wallet, (3) storing, into a memory of the smart wallet, a log event that includes the information and a current timestamp, (4) determining that the smart wallet is communicably coupled with a wireless device, (5) transmitting, to the wireless device, at least one log event, and (6) deleting the at least one log event from the memory.

Another embodiment sets forth a method implemented by a wireless device for managing physical cards stored in a smart wallet. According to some embodiments, the method includes the steps of (1) receiving at least one log event from the smart wallet, where the at least one log event indicates one or more physical cards that were stored in the smart wallet at a time the smart wallet recorded the at least one log event, (2) supplementing the at least one log event with location information based on a current location of the wireless device to establish a supplemented at least one log event, and (3) storing the supplemented at least one log event into a memory accessible to the wireless device.

Yet another embodiment includes a method implemented by a smart card for managing physical cards stored in a traditional wallet. According to some embodiments, the method includes the steps of (1) detecting a trigger condition, (2) gathering, using at least one communications component of the smart card, information associated with one or more physical cards stored in the traditional wallet in which the smart card is also stored, (3) storing, into a memory of the smart card, a log event that includes the information and a current timestamp, (4) determining that the smart card is communicably coupled with a wireless device, (5) transmitting, to the wireless device, at least one log event stored in the memory, and (6) deleting the at least one log event from the memory.

Other embodiments include a non-transitory computer readable medium configured to store instructions that, when executed by a processor included in a computing device, cause the computing device to implement the methods and techniques described in this disclosure. Yet other embodiments include hardware computing devices that include processors that can be configured to cause the hardware computing devices to implement the methods and techniques described in this disclosure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for managing (e.g., tracking or detecting the presence or absence of) physical cards stored in a physical wallet. In particular, the techniques set forth a smart wallet configured to manage physical cards stored therein, as well as a smart card configured to be inserted into a traditional wallet and to manage the physical cards stored therein. According to some embodiments, the smart wallet/smart card can be configured to, upon detecting a change to physical cards stored in the smart wallet/traditional wallet, gather information associated with one or more physical cards and store the information into a memory of the smart wallet/smart card. In turn, the smart wallet/smart card can, upon becoming communicably coupled to a wireless device, transmit the information to the wireless device for analysis by the wireless device. Subsequently, the wireless device can notify a user of any missing physical cards as well as provide remedial options.

These and other embodiments are discussed below with reference to FIGS. 1A to 5; however, those skilled in the art will readily appreciate that the detailed description given herein with respect to these figures is for explanatory purposes only and should not be construed as limiting.

Figure 1A:
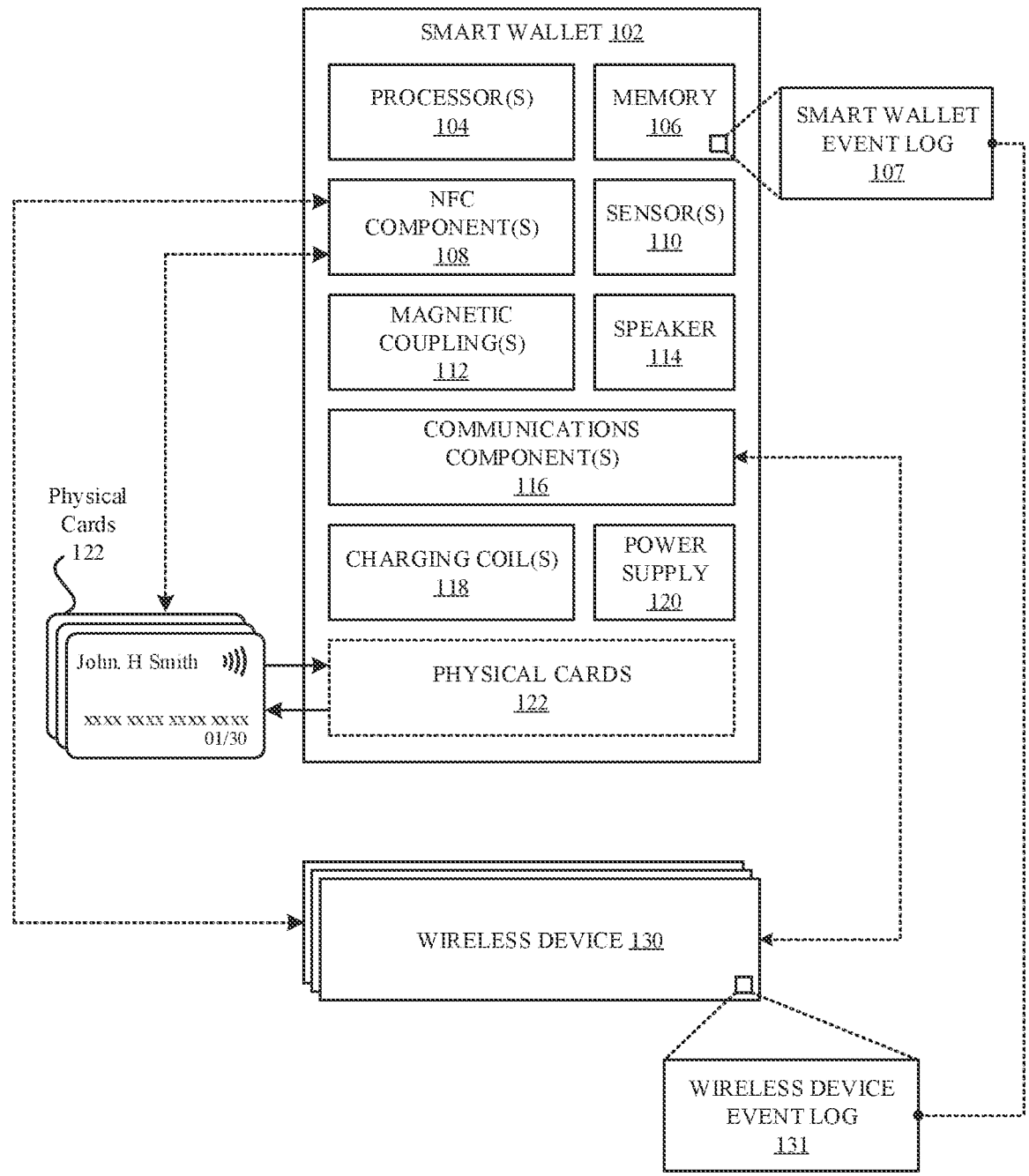
FIG. 1A illustrates a block diagram of different components of a smart wallet system for implementing the various techniques described herein, according to some embodiments.

FIG. 1A illustrates a block diagram of different components of a smart wallet system 100 for implementing the various techniques described herein, according to some embodiments. As shown in FIG. 1A, the smart wallet system 100 can include a smart wallet 102 that is configured to interface with one or more wireless devices 130. According to some embodiments, the smart wallet 102 can take the form of a physical wallet that includes at least one cavity (not illustrated in FIG. 1A) for receiving at least one physical card 122. For example, the physical wallet can take the form of a flat wallet, a foldable wallet, and so on, in which one or more physical cards 122 can be stored. The physical cards 122 can represent, for example, physical (i.e., plastic, metallic, etc.) cards that are traditionally held in wallets, such as identification cards, banking cards, credit cards, loyalty cards, insurance cards, radio frequency identification (RFID) cards, and the like. According to some embodiments, the smart wallet 102 can include one or more magnetic couplings 112 that pair with counterpart magnetic couplings included in one or more of the wireless devices 130. This approach provides a high level of convenience in that the smart wallet 102 can be physically attached/detached from the wireless device 130 through applications of only mild force.

As shown in FIG. 1A, the smart wallet 102 can include a power supply 120 (e.g., a battery) to supply power to various components of the smart wallet 102 (described in greater detail below) that require energy to operate. According to some embodiments, the smart wallet 102 can include charging coils 118 that enable the smart wallet 102 to wirelessly receive power—e.g., from a wireless charging apparatus, from a wireless device 130, etc.—that can then be provided to the power supply 120. Additionally (or alternatively), the smart wallet 102 can include electrical contacts that enable the power supply 120 to receive power from an external power source.

As also shown in FIG. 1A, the smart wallet 102 can include at least one processor 104 and at least one memory 106. According to some embodiments, the at least one memory 106 can represent a combination of volatile and non-volatile memories. The at least one memory 106 can store instructions that, when executed by the at least one processor 104, cause the processor (i.e., and, by extension, the smart wallet 102) to implement the various techniques described herein. As also shown in FIG. 1A, the smart wallet 102 can include one or more near-field communications (NFC) components 108. According to some embodiments, the smart wallet 102 can include an NFC component 108-1 for interfacing with other NFC-capable devices. For example, one or more of the wireless devices 130 may include NFC components that enable the smart wallet 102 and the wireless devices 130 to interface using NFC protocols. Under this approach, the NFC component 108-1 can provide information to the wireless device 130, such as identifying information for the smart wallet 102, information about physical cards stored in the smart wallet 102, and so on.

As also shown in FIG. 1A, the smart wallet 102 can include one or more communications components 116. According to some embodiments, the communications components 116 can enable the smart wallet 102 to engage in Bluetooth communications, ultra-wideband (UWB) communications, Wi-Fi communications, and the like. As described in greater detail herein, the communications components 116 can enable the smart wallet 102 to communicate with the wireless devices 130 at greater ranges than those typically afforded using NFC-based communications. In this manner, the smart wallet 102 can provide information to wireless devices 130 including when the smart wallet 102 is not physically attached (e.g., using the magnetic couplings 112) to the wireless devices 130 and/or is not in immediate physical proximity to the wireless devices 130 required to engage in NFC-based communications.

Additionally, the smart wallet 102 can include one or more speakers 114 capable of outputting sound in order to provide a variety of beneficial features. In one example, the smart wallet 102 can utilize the speakers 114 to output an alert when one or more of the physical cards 122 are removed from the smart wallet 102 for a threshold period of time. In another example, the smart wallet 102 can utilize the speakers 114 to output an alert when a wireless device 130 is within communicable range of smart wallet 102 but a user of the wireless device 130 is unable to find it. In yet another example, the smart wallet 102 can utilize the speakers 114 to output informative information, such as reports of refunds that have been processed on any of the physical cards 122 stored in the smart wallet 102, current balances on any of the physical cards 122 stored in the smart wallet, and so on. It is noted that the foregoing examples are not meant to be limiting. On the contrary, the speakers 114 can be utilized to convey any type of information without departing from the scope of this disclosure. Additionally, it is noted that the smart wallet 102 can include additional components not illustrated in FIG. 1A, such as lights, screens, etc., capable of conveying any type of information without departing from the scope of this disclosure.

According to some embodiments, the wireless device 130 can represent a mobile computing device (e.g., an iPhone®, an iPad®, an Apple Watch by Apple®, etc.). According to some embodiments, the smart wallet 102 can be uniquely paired with a single wireless device 130 such that the smart wallet 102 only communicates with that (single) wireless device 130. In an alternative approach, two or more wireless devices 130 (e.g., a mobile phone and a smart watch) can share a common user account (e.g., a cloud account) such that initial pairing information between the smart wallet 102 and one of the two or more wireless devices 130 can be shared among the two or more wireless devices 130. Under this approach, the smart wallet 102 can be configured to communicate with the two or more wireless devices 130, thereby improving overall flexibility and functionality.

Additionally, the smart wallet 102 can be configured to communicate with wireless devices 130 that are foreign to (yet capable of communicating with) the smart wallet 102. This approach can provide several benefits, especially in a scenario where the smart wallet 102 is misplaced and the wireless device(s) 130 to which the smart wallet is paired are not in communications range with the smart wallet 102. In this scenario, the smart wallet 102 can periodically transmit (or respond to requests for) information to nearby/foreign wireless devices 130. In turn, the nearby/foreign wireless devices 130 can communicate the information—e.g., to a centralized server—to enable remedial measures to take place, such as notifying the owner of the smart wallet 102 of its approximate location. It is noted that obfuscation measures can be implemented under this scenario in order to establish a level of privacy that is beneficial to users of the smart wallet 102 and the foreign wireless devices 130. For example, the smart wallet 102 can modify the information so that it cannot be exploited by any malicious users of the foreign wireless devices 130 that manage to gain access to the information. Moreover, the foreign wireless devices 130 can perform their interactions with the smart wallet 102 in the background so that malicious users of the foreign wireless devices 130 are not exposed to information about the smart wallet 102 that might otherwise be exploited.

As further shown in FIG. 1A, the smart wallet 102 can also include one or more sensors 110 to enable and/or enhance the different features described herein. For example, the sensors 110 can include an accelerometer for identifying when the smart wallet 102 undergoes motion that is indicative of changes to the physical cards 122 stored within the smart wallet 102. In yet another example, the sensors 110 can include tactile sensors for identifying when physical cards 122 are inserted into/removed from the smart wallet 102. In a further example, the sensors 110 can include different gauges (e.g., a pressure gauge, a strain gauge, an articulable lever, etc.) that detect changes to the physical cards 122 stored within the smart wallet 102. It is noted that the foregoing sensor 110 examples are not meant to be limiting, and that any sensor can be utilized that enables the smart wallet 102 to effectively identify when changes occur to the physical cards 122 stored in the smart wallet 102.

In any case—and, as described in greater detail herein— the smart wallet 102 can be configured to perform different techniques upon detecting a change to the physical cards 122 stored in the smart wallet 102. In particular, the smart wallet 102 can be configured to perform a polling technique that identifies the physical cards 122, if any, that remain stored in the smart wallet 102 after the change is detected. According to some embodiments, the polling technique can be performed using an NFC component 108-2 configured to interface with NFC-capable (i.e., "contactless") physical cards 122. According to some embodiments, the NFC component 108-2 can be configured to scan all NFC-equipped physical cards 122 present in the smart wallet 102 and to store the information into a smart wallet event log 107 that is managed in the memory 106. Under this approach, the smart wallet 102 can immediately forward the information to a wireless device 130 that is within communications range of the smart wallet 102 (e.g., using the NFC component 108-1 and/or the communications components 116). Alternatively, when the smart wallet 102 is not in communications range with a wireless device 130, the smart wallet 102 can maintain the information in the smart wallet event log 107. In turn, the smart wallet 102 can ultimately provide the information when it enters into communications range with an eligible wireless device 130. In any case, the smart wallet 102 can also be configured to remove information from its memory 106 when appropriate, e.g., when the information becomes redundant, when the information has been transmitted to at least one wireless device 130, when the information becomes obsolete, and so on.

When the wireless device 130 receives the information from the smart wallet 102, the wireless device 130 can modify and/or supplement the information and store it into a wireless device event log 131. For example, the wireless device 130 can add timestamp information, location information, and so on, in order to establish a richer set of information associated with the smart wallet 102 and the physical cards 122 therein. This enriched information can enable the wireless device 130 to monitor the usage of the smart wallet 102 and/or the physical cards 122 stored therein in order to identify situations where it is appropriate to warn a user of the smart wallet 102. Such situations can include, for example, the wireless device 130 identifying that the smart wallet 102 has been out of communications range for a threshold period of time, identifying that one or more physical cards 122 were removed from and not returned to the smart wallet 102 within a threshold period of time, and so on. It is noted that the foregoing examples are not meant to be limiting. On the contrary, the wireless device 130 (and/or the smart wallet 102 itself) can be configured to identify any scenario in which it would be prudent to provide useful information to a user without departing from the scope of this disclosure.

Figure 1B:
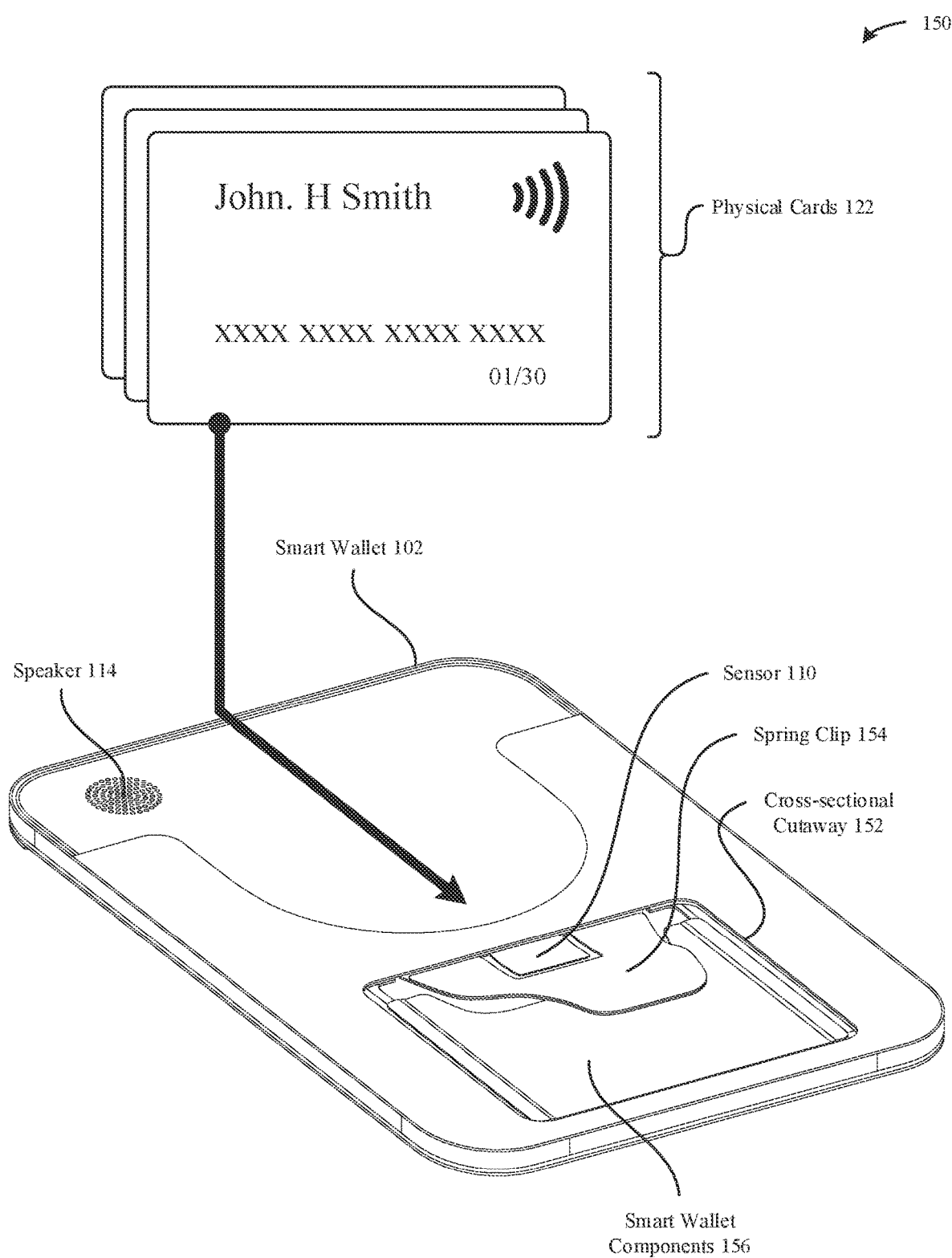
FIG. 1B illustrates a conceptual diagram of a smart wallet and physical cards of FIG. 1A, according to some embodiments.

FIG. 1B illustrates a conceptual diagram 150 of the smart wallet 102 and the physical cards 122 of FIG. 1A, according to some embodiments. As shown in FIG. 1B, the smart wallet 102 can take the form of a flat wallet that is attachable to the back of a wireless device 130, such as the iPhone® Leather Wallet with MagSafe® manufactured by Apple® that is attachable to iPhones®. As shown in FIG. 1B, a cross-sectional cutaway 152 provides an internal view of a specific portion of the smart wallet 102. In particular, the interval view exposes smart wallet components 156 of the smart wallet 102, such as those discussed above in conjunction with FIG. 1A. Additionally, the internal view exposes a spring clip 154, which can be employed to exert a force against physical cards 122 that are inserted into the smart wallet 102. Under this approach, the spring clip 154 can help prevent the physical cards 122 from simply falling out of the smart wallet 102 under common scenarios, e.g., when only a single card is stored in the smart wallet 102, when the smart wallet 102 is placed into an upside-down orientation, and so on. Moreover, the spring clip 154 can be connected to one or more of the sensors 110 described above in conjunction with FIG. 1A, such as a strain gauge that detects changes to the spring clip 154 (e.g., its position, its exerted force, etc.). It is again noted that the embodiments are not limited to the spring clip/strain gauge approach discussed herein, and that any approach for effectively identifying changes to the physical cards 122 stored in the smart wallet 102 can be employed without departing from the scope of this disclosure.

Figure 1C:
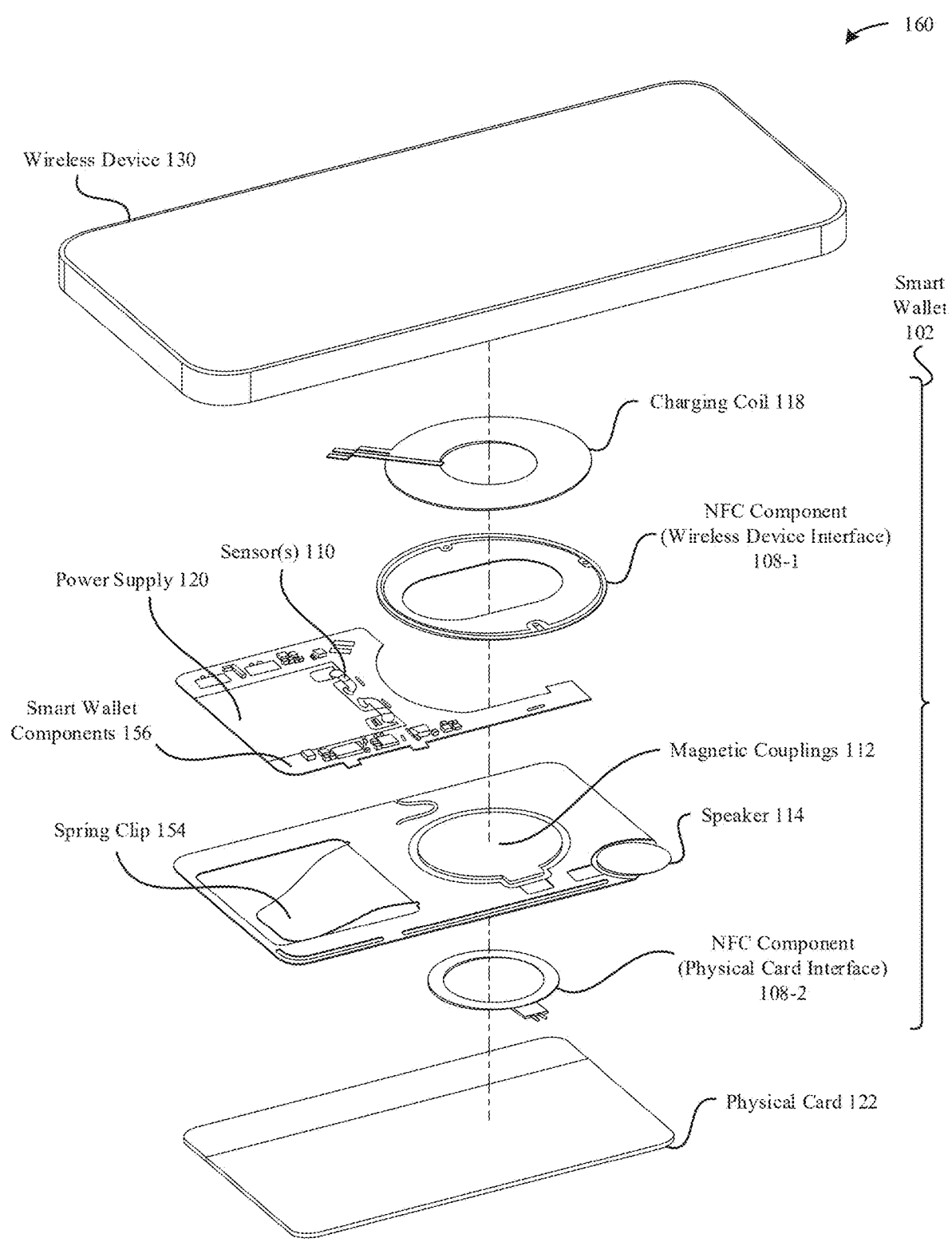
FIG. 1C illustrates a stack diagram of the manner in which a wireless device, a subset of components of a smart wallet, and a physical card interact with one another, according to some embodiments.

FIG. 1C illustrates a stack diagram 160 of the manner in which a wireless device 130, a subset of components of a smart wallet 102, and a physical card 122 interact with one another, according to some embodiments. As shown in FIG. 1C, the subset of the components of the smart wallet 102 can include the charging coil 118, the NFC component 108-1 (configured to interface with wireless devices 130), one or more sensors 110, the power supply 120, the magnetic couplings 112, the speaker 114, the NFC component 108-2 (configured to poll physical cards 122). Other components of the smart wallet 102 that are not specifically illustrated in FIG. 1C are represented, at least in part, by the smart wallet components 156.

As shown in FIG. 1C, the charging coil 118 can be positioned topmost (relative to the other components) in the smart wallet 102 such that the smart wallet 102 is capable of receiving wireless power from a compatible entity, such as the wireless device 130. As also shown in FIG. 1C, the NFC component 108-1 can be positioned in the smart wallet 102 such that the NFC component 108-1 and an NFC component of the wireless device 130 are capable of exchanging information. As additionally shown in FIG. 1C, the sensor(s) 110 and the spring clip 154 can be positioned in the smart wallet 102 such that the sensor(s) 110 is/are capable of detecting the changes to the physical cards 122 stored in the smart wallet 102 (e.g., using the techniques described above in conjunction with FIG. 1B). As further shown in FIG. 1C, the power supply 120 and the speaker 114 can be formed and positioned so that the smart wallet 102 can maintain a thin profile. As further shown in FIG. 1C, the magnetic couplings 112 can be positioned such that, when the smart wallet 102 is placed into the appropriate position/proximity relative to the wireless device 130, the magnetic couplings 112 interact with counterpart magnetic couplings in the wireless device 130 and cause the smart wallet 102 and wireless device 130 to physically couple to one another. As additionally shown in FIG. 1C, the NFC component 108-2 can be positioned in the smart wallet such that the NFC component 108-2 can execute polling operations to identify the physical cards 122, if any, that are stored in the smart wallet 102.

Additionally, and although not illustrated in FIG. 1C, it is noted that any number/type of materials can be included in the smart wallet 102 in order to eliminate problematic interference that might otherwise arise between the various components of the smart wallet 102. In particular, one or more layers may be introduced to eliminate interference that may arise between the charging coil 118, the NFC component 108-1, the magnetic couplings 112, and/or the NFC component 108-2. Additionally, the cavity of the smart wallet 102 into which the physical cards 122 are placed may be separated into different layers using any number/type of materials in order to eliminate polling intersections that may arise when the NFC component 108-2 performs the physical card 122 polling operations discussed herein.

Accordingly, FIGS. 1A, 1B, and 1C provide detailed breakdowns of how the different components of the smart wallet 102 and the wireless devices 130 can be organized in order to enable the various techniques described herein to be implemented. A more detailed breakdown of these techniques is provided below in conjunction with FIGS. 2A-2G.

Figure 2A:
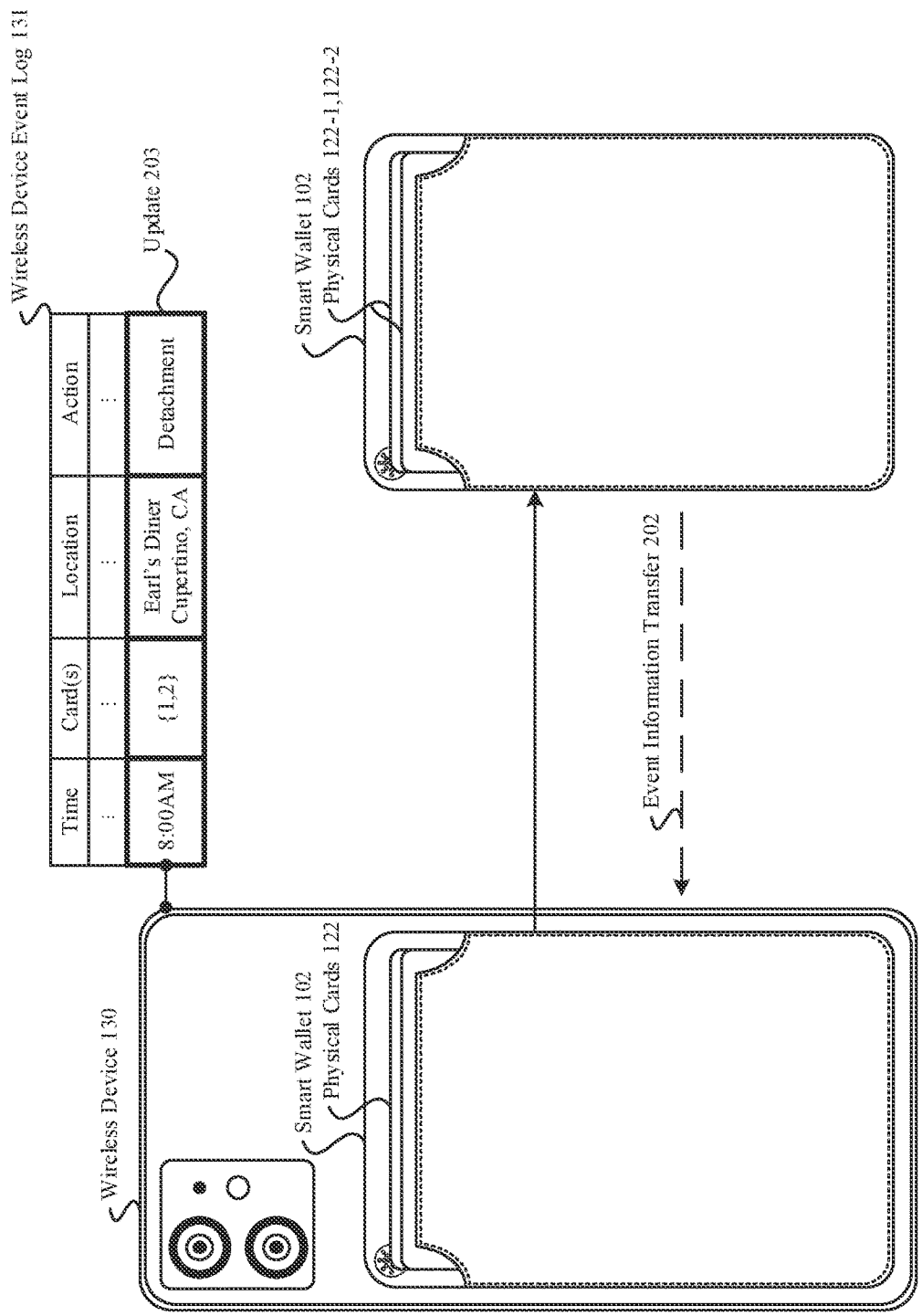
FIGS. 2A, 2B, 2C, 2D, and 2E illustrate a conceptual diagram of example interactions between a wireless device and a smart wallet, according to some embodiments.

FIGS. 2A, 2B, 2C, 2D, and 2E illustrate a conceptual diagram 200 of example interactions between a wireless device 130 and a smart wallet 102, according to some embodiments. As shown in FIG. 2A, the example scenario begins where the smart wallet 102 stores two physical cards 122-1, 122-2 and is physically attached to the wireless device 130 (e.g., using the magnetic techniques discussed herein). Again, it is noted that the physical attachment capabilities discussed herein are not required given the smart wallet 102 can include communications components 116 (e.g., Bluetooth, UWB, Wi-Fi, etc.) that enable the smart wallet 102 to communicate with the wireless device 130 at greater distances relative to those afforded by the NFC component 108-1.

In any case, a step 201 involves a user detaching the smart wallet 102 from the wireless device 130 (e.g., using the detachment techniques discussed herein). This can occur, for example, when a user at a diner detaches their smart wallet 102 from the wireless device 130 and begins walking toward the cashier at the far side of the diner to pay their bill. According to some embodiments, the wireless device 130 can, upon detecting the detachment of the smart wallet 102, issue a request for the smart wallet 102 to provide information about the physical cards 122, if any, currently stored in the smart wallet 102. Alternatively, the smart wallet 102 can self-identify its detachment from the wireless device 130 and provide the information to the wireless device 130 in conjunction with the detachment.

In any case, and as shown in FIG. 2A, the smart wallet 102 performs an event information transfer 202, which involves providing information to the wireless device 130 about the physical cards 122 detected by the smart wallet 102 (i.e., the physical cards 122-1, 122-2) at the time (i.e., 8:00 AM) of the event (i.e., the detachment). Again, the smart wallet 102 can generate this information using the NFC component 108-2 polling techniques described herein. In response, the wireless device 130 performs an update 203 to the wireless device event log 131. As shown in FIG. 2A, the update 203 can involve the wireless device 130 supplementing the information (provided by the smart wallet 102) with additional information. For example, the wireless device 130 can supplement the information with a current location (i.e., Earl's Diner in Cupertino, CA) of the wireless device 130—which, by virtue of being communicably coupled with the smart wallet 102 via short-range communications protocols, constitutes a current location of the smart wallet 102 as well. The wireless device 130 can also supplement the information with a type of action associated with the event information transfer 202 (e.g., an attachment, a detachment, a periodic update, a change to the physical cards stored in the smart wallet 102, and so on). In turn, and as described in greater detail herein, the wireless device event log 131 can be utilized by the wireless device 130 to identify situations in which it is prudent to warn a user of potential concerns about the smart wallet 102 and/or the physical cards 122 associated with it.

Figure 2B:
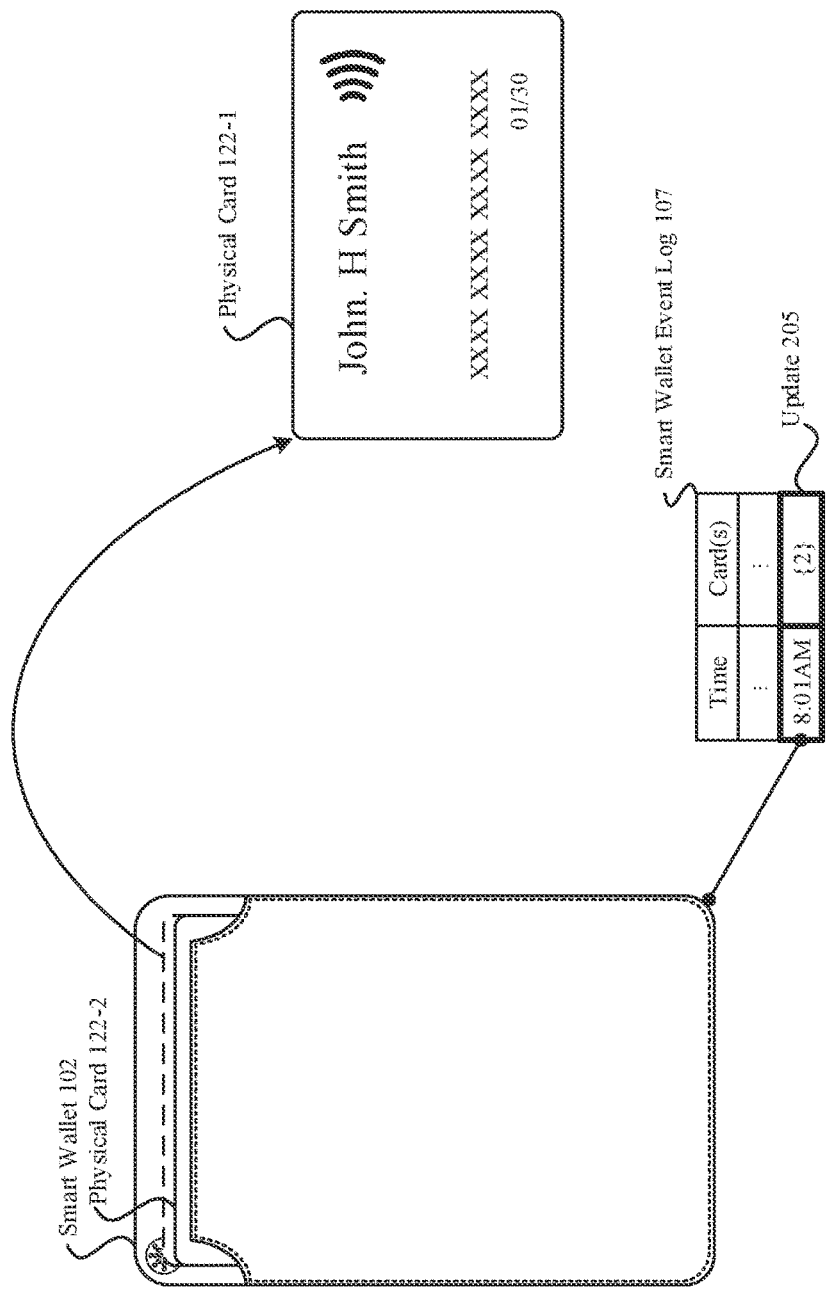

Turning now to FIG. 2B, a step 204 involves the physical card 122-1 being removed from the smart wallet 102 when the smart wallet 102 is not communicably coupled with the wireless device 130. Continuing with the foregoing example, this step can represent the user (and the smart wallet 102 being carried by the user) reaching the cashier at distance where the smart wallet 102 and the wireless device 130 are incapable of communicating using the short-range communications protocols discussed herein. It is noted, however, that if the smart wallet 102 were equipped with WiFi and/or cellular capabilities, then the smart wallet 102 could remain communicably coupled with the wireless device 130 regardless of distance.

In any case, the smart wallet 102 can detect the removal of the physical card 122-1 at step 204 using any the approaches discussed herein (e.g., the spring clip 154 and a strain gauge sensor 110). In response to detecting the removal of the physical card 122-1, the smart wallet 102 can perform a polling operation using any of the approaches discussed herein (e.g., using the NFC component 108-2 to scan the remaining physical cards 122, if any, stored in the smart wallet 102 (i.e., the physical card 122-2)). As noted above, in this example scenario, the smart wallet 102 is out of communications range with the wireless device 130 and is unable to provide information about the event to the wireless device 130. Accordingly, the smart wallet 102 can perform an update 205 that involves locally recording the event in the smart wallet event log 107. As shown in FIG. 2B, the update 205 can involve the smart wallet 102 updating the smart wallet event log 107 to include an entry for the event, which includes both a time (i.e., 8:01 AM) of the event as well as information about the physical cards 122, if any, detected in conjunction with the event. It is noted that the information stored in the smart wallet event log 107 is exemplary and not meant to be limiting. On the contrary, the smart wallet 102 can be configured to store any form of information, at any level of granularity, associated with the removal of the physical card 122-2 without departing from the scope of this disclosure.

As a brief aside, it is noted that the smart wallet 102 can be configured to delay its polling operation relative to detecting changes to the physical cards 122 stored therein. This approach can be help avoid situations in which the smart wallet 102 successfully scans a physical card 122 that is in the process of being removed from the smart wallet 102 (and thus should not be detected as being present in the smart wallet 102). This approach can also be beneficial in that it helps avoid situations in which the smart wallet 102 unsuccessfully scans a physical card 122 that is in the process of being inserted back into the smart wallet 102 (and thus should be detected as being present in the smart wallet 102). In one example approach, the smart wallet 102 can be configured to, upon detecting a change to physical cards 122 stored therein, start a five-second countdown timer that, upon lapsing, causes the smart wallet 102 to perform the polling operation. It is noted that the foregoing approaches are not meant to be limiting, and that any approach can be utilized to help avoid false positive/negative readings of physical cards 122 when changes are detected to the physical cards 122 stored in the smart wallet 102.

Figure 2C:
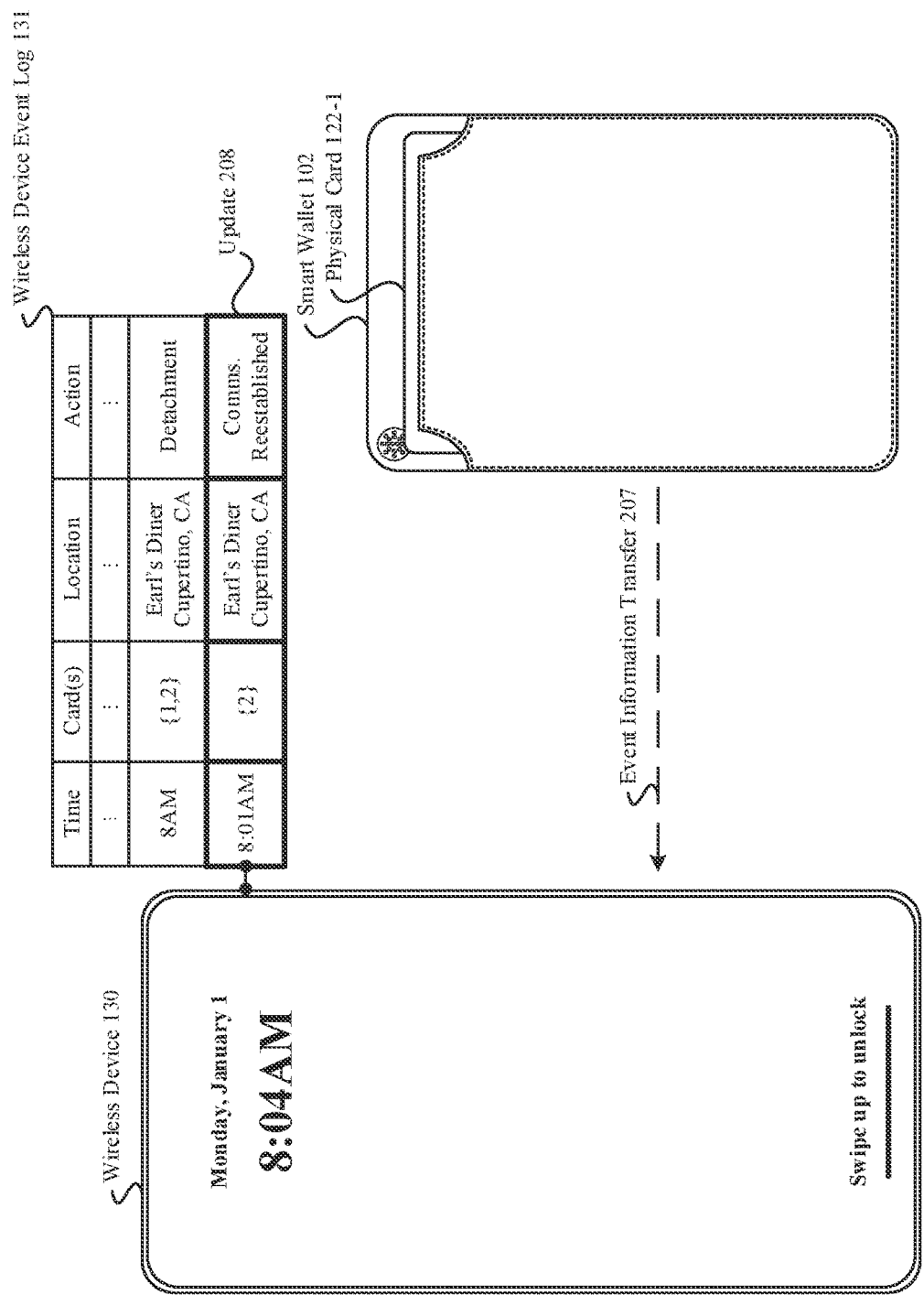

Turning now to FIG. 2C, a step 206 involves the smart wallet 102 entering back into communications range with the wireless device 130 and communicably coupling with the wireless device 130. Continuing with the foregoing example, this step can represent the user (and the smart wallet 102 being held by the user) returning to their booth and preparing to leave the diner, such that the smart wallet 102 and the wireless device 130 are now capable of communicating using the short-range communications protocols discussed herein. As shown in FIG. 2C, the smart wallet 102 can provide, via an event information transfer 207, all (or a subset) of the information that is locally stored in the smart wallet event log 107, e.g., any information that has not yet been provided to the wireless device 130. In turn, the wireless device 130 can perform an update 208 that involves updating the wireless device event log 131 using the techniques described above in conjunction with step 201 of FIG. 2A. It is noted that the smart wallet 102 can optionally be configured to remove the information from the smart wallet event log 107 upon confirming that the wireless device 130 has successfully received and processed the information in its wireless device event log 131.

Figure 2D:
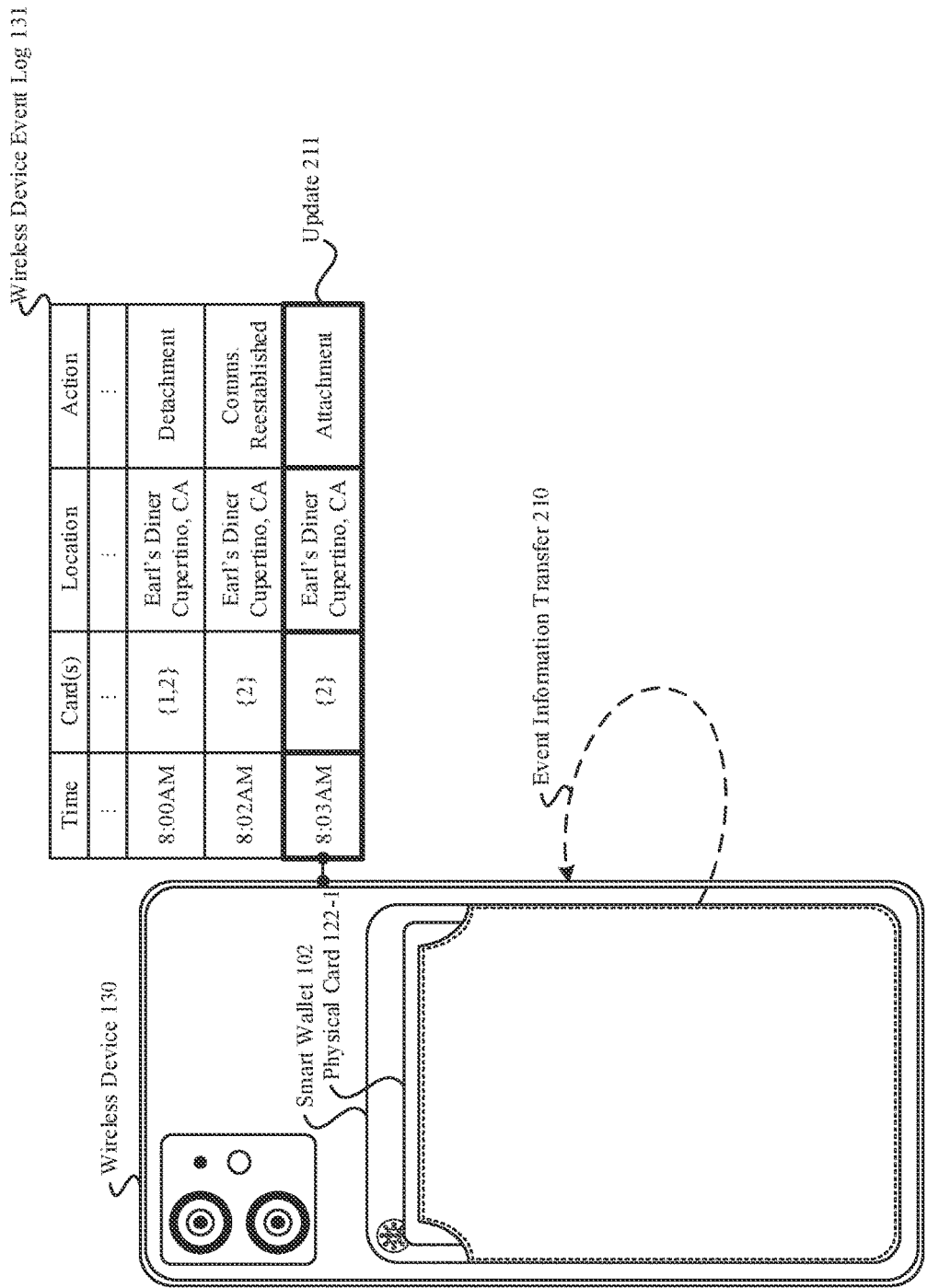

Turning now to FIG. 2D, a step 209 involves the smart wallet 102 physically reattaching to the wireless device 130 (e.g., using the attachment techniques discussed herein). Continuing with the foregoing example, this step can represent the user reattaching their smart wallet 102 to their wireless device 130, such that the smart wallet 102 and the wireless device 130 are now capable of communicating using any of the short-range communications protocols discussed herein (e.g., using the NFC component 108-1 and/or the communications components 116). As shown in FIG. 2D, the smart wallet 102 can provide, via an event information transfer 210, information to the wireless device 130 about the physical cards 122 detected by the smart wallet 102 (i.e., the physical card 122-2) at the time (i.e., 8:03 AM) of the event (i.e., the attachment). In turn, the wireless device 130 can perform an update 211 that involves updating the wireless device event log 131 using the techniques described above in conjunction with step 201 of FIG. 2A and step 206 of FIG. 2C.

Figure 2E:
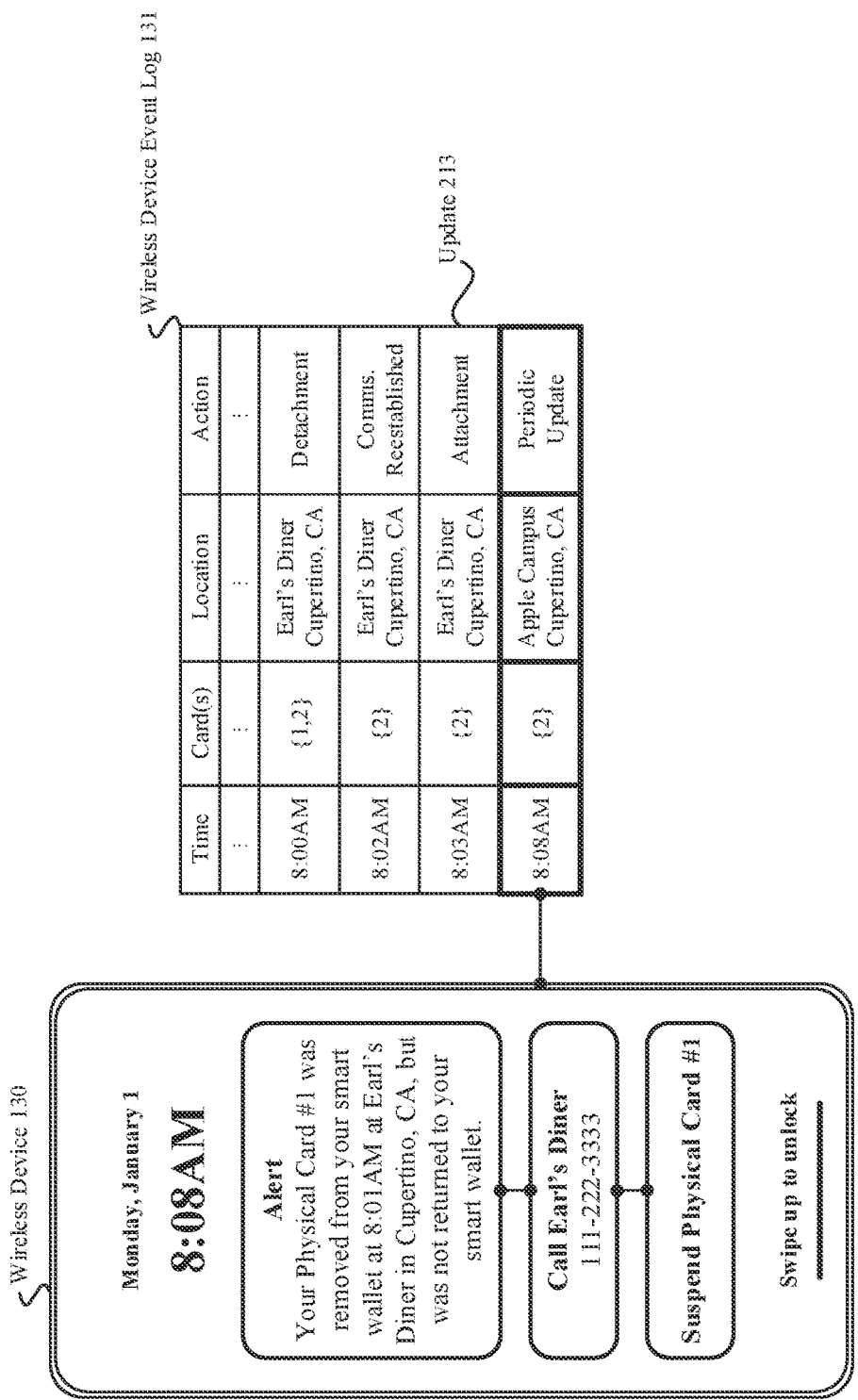

Turning now to FIG. 2E, a step 212 involves the wireless device 130 determining that a threshold amount of time has lapsed and that physical card 122-1 is still missing from the smart wallet 102. Reaching this conclusion first involves the wireless device 130 performing an update 213 to the wireless device event log 131 in response to receiving a periodic update (not illustrated in FIG. 2E) from the smart wallet 102 about the physical cards 122 stored therein. In turn, the wireless device 130 identifies, based on the information stored in the wireless device event log 131, that the physical card 122-1 has been missing from the smart wallet 102 since at least 8:02 AM. Subsequently, the wireless device 130 compares the current time to the last time the physical card 122-1 was detected by the smart wallet 102 in order to determine whether the threshold amount of time (e.g., five minutes) has lapsed. In the example illustrated in FIG. 2E, the current time is 8:08 AM, which means that (1) approximately six minutes has passed since the physical card 122-1 was last detected, and (2) the threshold amount of time has lapsed.

Accordingly, the wireless device 130 can be configured to display a user interface that provides information about the circumstances of detecting that the physical card 122-1 is missing from the smart wallet 102 (e.g., a name of the physical card 122-1, a time, a location, etc.). Additionally, and as shown in FIG. 2E, the wireless device 130 can present useful options to the user for selection. For example, the wireless device 130 can identify one or more phone numbers, if any, associated with the last known location of the physical card 122-1, and present an option to call the one or more phone numbers with a single tap. In another example, the wireless device 130 can enable the user to suspend (or, alternatively, cancel) the physical card 122-1 to prevent any potential fraud from transpiring. This could involve, for example, connecting the user with the provider of the physical card 122-1 so that the appropriate measures could be taken. In another example, the suspension could be automated such that a selection of the option causes the wireless device 130 to interface with the provider of the physical card 122-1 and request a change to the status of the physical card 122-1. In yet another example, the wireless device 130 can obtain directions to the last known location in order to provide information about the most optimal way to return to the last known location to improve the odds of recovering the physical card 122-1. It is noted that the foregoing examples are not meant to be limiting, and that the wireless device 130 can provide any form of assistance in managing the potential loss of physical cards 122 without departing from the scope of this disclosure.

It is noted that the various thresholds, actions, timers, etc., described above in conjunction with FIGS. 2A, 2B, 2C, 2D, and 2E are exemplary and not meant to be limiting. On the contrary, these aspects can be modified in any manner without departing from the scope of this disclosure. For example, shorter thresholds/timers, a higher number of actions that involve polling operations, etc., can be implemented to increase the overall aggressiveness by which the wireless device 130/the smart wallet 102 seek to identify potentially problematic issues. It is noted, however, that such changes may be detrimental in that they will consume more power and could unnecessarily alert users about conditions that, in fact, are not problematic. Alternatively, longer thresholds/timers, a lower number of actions that involve polling operations, etc., can be implemented to decrease the overall aggressiveness by which the wireless device 130/the smart wallet 102 seek to identify potentially problematic issues. Again, however, it is noted that while such changes will lead to power savings, they could also introduce delays with respect to the detection of potentially problematic issues. Accordingly, the various thresholds, actions, timers, etc., discussed herein can be dynamically adjustable to achieve a desired balance between power savings and effectiveness.

Accordingly, FIGS. 2A, 2B, 2C, 2D, and 2E provide an example scenario under which the smart wallet 102 and the wireless device 130 interact with one another and identify a potentially problematic scenario that warrants notifying a user. More generalized methods that can be implemented by the smart wallet 102 and the wireless device 130 are discussed below in conjunction with FIGS. 2F and 2G, respectively.

Figure 2F:
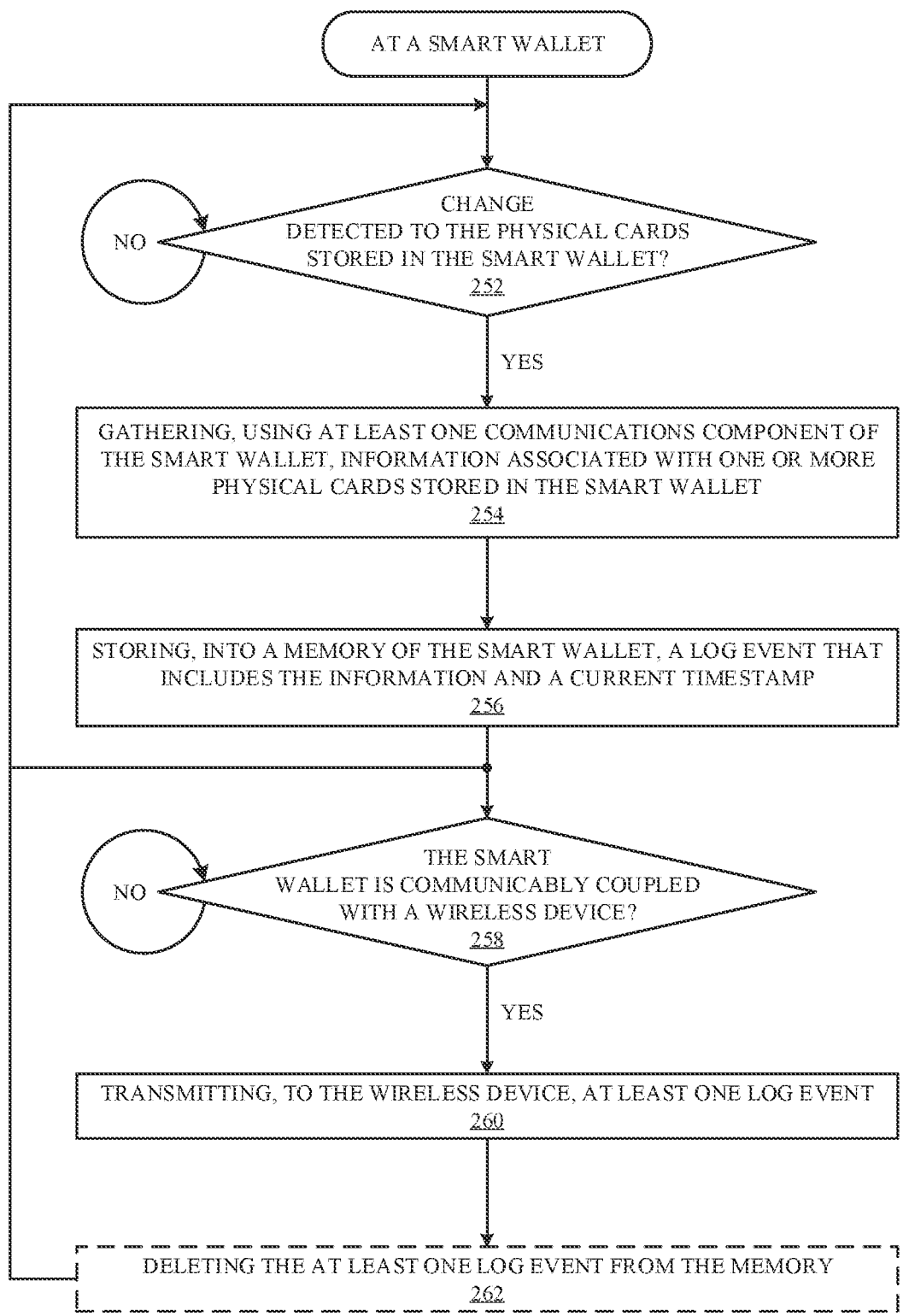
FIG. 2F illustrates a method that can be implemented by a smart wallet to manage physical cards stored therein, according to some embodiments.

FIG. 2F illustrates a method 250 that can be implemented by the smart wallet 102 to manage (e.g., track or detect the presence or absence of) physical cards 122 stored therein, according to some embodiments. As shown in FIG. 2, the method 250 begins at step 252, where the smart wallet 102 determines whether any changes are detected to the physical cards 122 stored in the smart wallet 102 (e.g., using any of the detection approaches discussed herein). If, at step 252, the smart wallet 102 determines that changes are detected to the physical cards 122 stored therein, then the method proceeds to step 254. Otherwise, step 252 is repeated until changes are detected.

At step 254—i.e., subsequent to detecting changes to the physical cards 122 stored in the smart wallet 102—the smart wallet 102 gathers, using at least one communications component (i.e., the NFC component 108-2) of the smart wallet 102, information associated with one or more physical cards 122 stored in the smart wallet 102. At step 256, the smart wallet 102 stores, into a memory of the smart wallet 102 (i.e., the smart wallet event log 107 in the memory 106), a log event that includes the information and a current timestamp.

At step 258, the smart wallet 102 determines whether the smart wallet 102 is communicably coupled with a wireless device 130. If, at step 258, the smart wallet 102 determines that the smart wallet 102 is communicably coupled with a wireless device 130, then the method 250 proceeds to step 260. Otherwise, step 258 is repeated until the smart wallet 102 becomes communicably coupled with a wireless device 130. It is noted that smart wallet 102 can also execute step 252 when additional changes to the physical cards 122 stored in the smart wallet 102 are detected in the meantime.

At step 260—which occurs when the smart wallet 102 establishes communications with the wireless device 130—the smart wallet 102 transmits, to the wireless device 130, at least one log event. In some embodiments, the at least one log event is stored in the memory of the smart wallet 102. Finally, at optional step 262, the smart wallet 102 deletes the at least one log event from the memory.

Figure 2G:
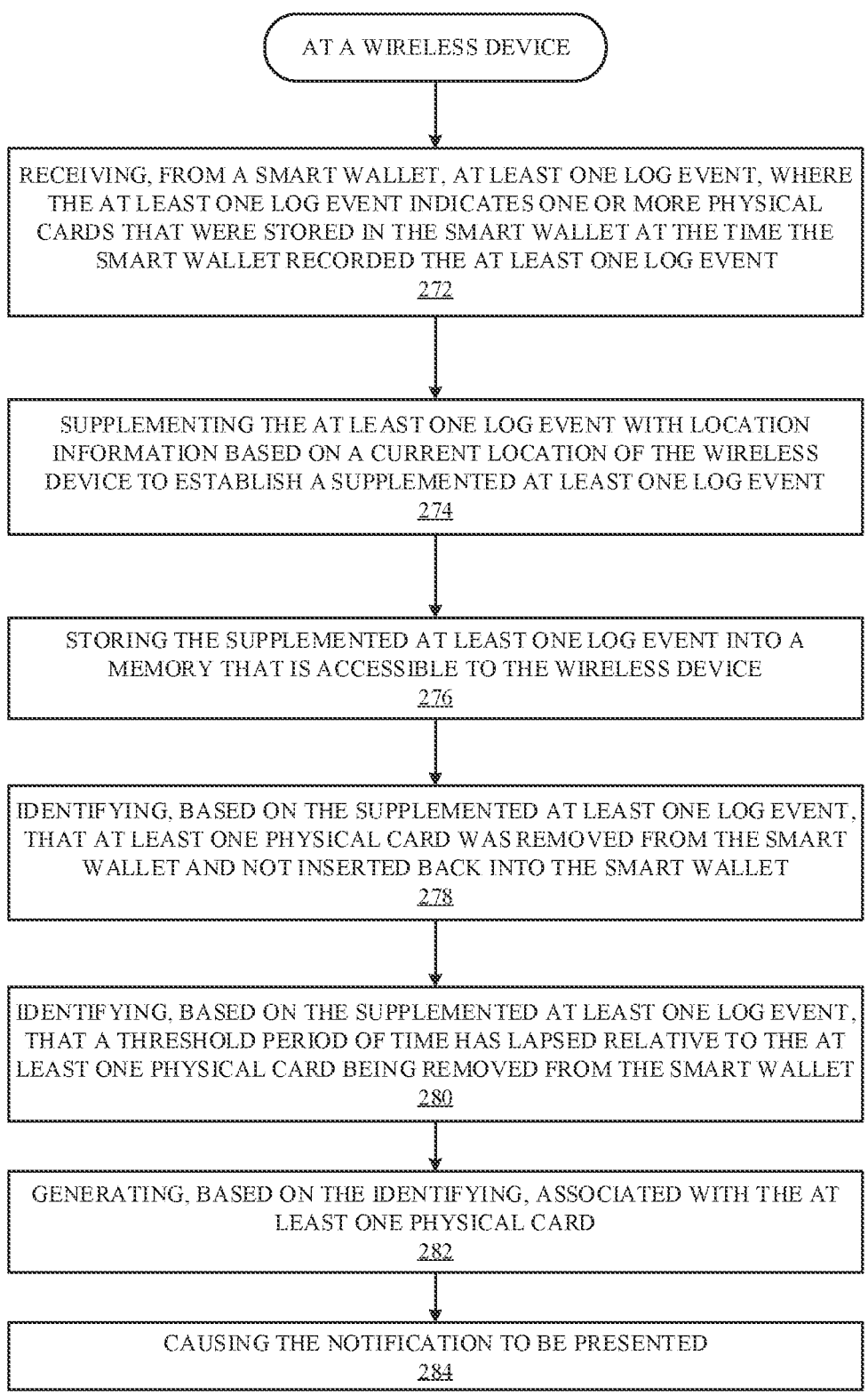
FIG. 2G illustrates a method that can be implemented by a wireless device for managing physical cards stored in a smart wallet, according to some embodiments.

FIG. 2G illustrates a method 270 that can be implemented by the wireless device 130 for managing (e.g., tracking or detecting the presence or absence of) physical cards 122 stored in a smart wallet 102, according to some embodiments. As shown in FIG. 2G, the method 270 begins at step 272, where the wireless device 130 receives, from the smart wallet 102, at least one log event, where the at least one log event indicates one or more physical cards 122 that were stored in the smart wallet 102 at the time the smart wallet 102 recorded the at least one log event.

At step 274, the wireless device 130 supplements the at least one log event with location information based on a current location of the wireless device 130 to establish a supplemented at least one log event. At step 276, the wireless device 130 stores the supplemented at least one log event into a memory (i.e., the wireless device event log 131) that is accessible to the wireless device 130.

At step 278, the wireless device 130 identifies, based on the supplemented at least one log event, that at least one physical card 122 was removed from the smart wallet 102 and not inserted back into the smart wallet 102. At step 280, the wireless device 130 identifies, based on the supplemented at least one log event, that a threshold period of time has lapsed relative to the at least one physical card 122 being removed from the smart wallet 102.

At step 282, the wireless device 130 generates, based on the identifying, a notification associated with the at least one physical card. At step 284, the wireless device 130 causes the notification to be presented, e.g., displayed.

Accordingly, FIGS. 1A, 1B, and 1C and FIGS. 2A, 2B, 2C, 2D, 2E, 2F, and 2G set forth a smart wallet configured to manage (e.g., track or detect the presence or absence of) physical cards stored therein and to interface with a wireless device. Additionally, and as previously described herein, the embodiments also set forth a smart card configured to be inserted into a traditional wallet and to manage (e.g., track or detect the presence or absence of) physical cards stored therein. Various details of this smart card are provided below in conjunction with FIGS. 3A and 3B and FIGS. 4A, 4B, 4C, 4D, and 4E.

Figure 3A:
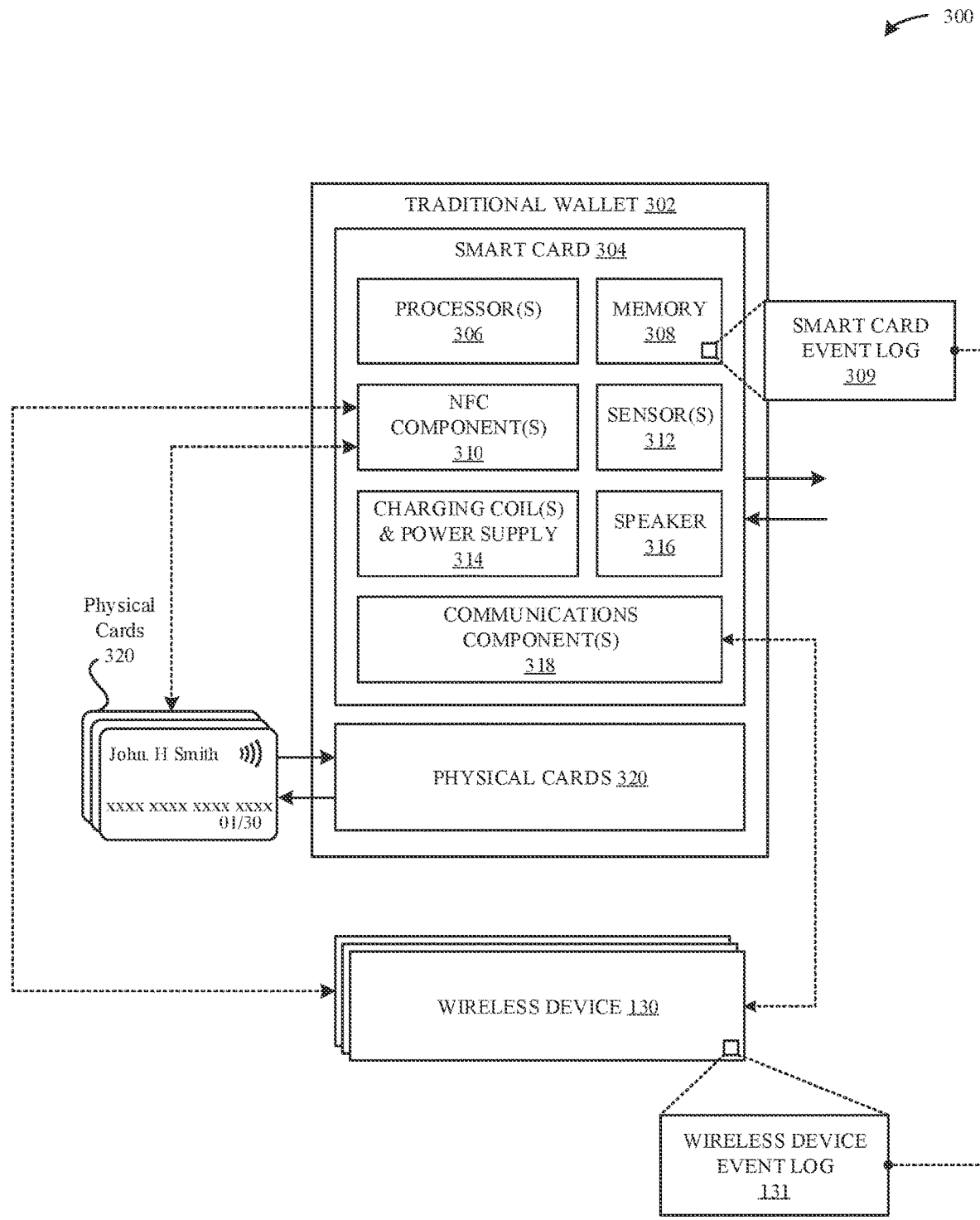
FIG. 3A illustrates a block diagram of different components of a smart card system for implementing the various techniques described herein, according to some embodiments.

Accordingly, FIG. 3A illustrates a block diagram of different components of a smart card system 300 for implementing the various techniques described herein, according to some embodiments. As shown in FIG. 3A, the smart card system 300 can include smart card 304 that is configured to interface with one or more wireless devices 130. According to some embodiments, the smart card 304 can take the form of a physical card sized in accordance with standard physical cards that are typically stored in wallets (e.g., a common credit card form factor). For example, as shown in FIG. 3A, both the smart card 304 and one or more physical cards 320 can be stored in a traditional wallet 302 that includes at least one cavity (not illustrated in FIG. 3A) for receiving physical cards. For example, the traditional wallet 302 can take the form of a flat wallet, a foldable wallet, and so on. The physical cards 320 can be similar or equivalent to the physical cards 122 described herein.

As shown in FIG. 3A, the smart card 304 can include a charging coil/power supply component 314 that operates in the same or a similar manner as the charging coil(s) 118 and the power supply 120 of the smart wallet 102 described herein. In particular, the charging coil/power supply component 314 can gather power from an external source and store/provide the power to various components of the smart card 304 (described in greater detail below) that require energy to operate. Additionally (or alternatively), the smart card 304 can include electrical contacts that enable the smart card 304 to receive power from an external power source.

As also shown in FIG. 3A, the smart card 304 can include at least one processor 306 and at least one memory 308. According to some embodiments, the at least one memory 308 can represent a combination of volatile and non-volatile memories. The at least one memory 308 can store instructions that, when executed by the at least one processor 306, cause the processor (i.e., and, by extension, the smart card 304) to implement the various techniques described herein. As also shown in FIG. 3A, the smart card 304 can include one or more near-field communications (NFC) components 310. According to some embodiments, the smart card 304 can include an NFC component 310-1 for interfacing with other NFC-capable devices, such as contactless credit card readers that enable the smart card 304 to be used to perform contactless payment transactions.

As also shown in FIG. 3A, the smart card 304 can include one or more communications components 318. According to some embodiments, the communications components 318 can enable the smart card 304 to engage in Bluetooth communications, ultra-wideband (UWB) communications, Wi-Fi communications, and the like, with the wireless devices 130. Additionally, the smart card 304 can include one or more speakers 316 capable of operating in the same or similar manner as the speaker 114 of the smart wallet 102 described herein.

Like the smart wallet 102, the smart card 304 can be configured to interact with one or more wireless devices 130 depending on the desired configuration. In particular, the smart card 304 can be uniquely paired with a single wireless device 130 such that the smart card 304 only communicates with that (single) wireless device 130. In an alternative approach, two or more wireless devices 130 (e.g., a mobile phone and a smart watch) can share a common user account (e.g., a cloud account) such that initial pairing information between the smart card 304 and one of the two or more wireless devices 130 can be shared among the two or more wireless devices 130. Under this approach, the smart card 304 can be configured to communicate with the two or more wireless devices 130, thereby improving overall flexibility and functionality. Additionally, the smart card 304 can be configured to communicate with wireless devices 130 that are foreign to (yet capable of communicating with) the smart card 304 (e.g., in accordance with the techniques described above in conjunction with FIG. 1A). Again, this approach can provide several benefits, especially in a scenario where the smart card 304 is misplaced and the wireless device(s) 130 to which the smart wallet is paired are not in communications range with the smart card 304.

As further shown in FIG. 3A, the smart card 304 can also include one or more sensors 312 to enable and/or enhance the different features described herein. For example, the sensors 312 can include an accelerometer for identifying when the smart card 304 undergoes motion that is indicative of changes to the physical cards 320 stored within the smart card 304. It is noted that the foregoing sensor 312 examples are not meant to be limiting, and that any sensor can be utilized that enables the smart card 304 to effectively identify when changes occur to the physical cards 320 stored in the smart card 304.

In any case—and, as described in greater detail herein—the smart card 304 can be configured to perform the same or similar techniques to those performed by the smart wallet 102 described herein. In particular, the smart card 304 can be configured to perform polling techniques using an NFC component 310-2 configured to interface with NFC-capable (i.e., "contactless") physical cards 320 stored in the traditional wallet 302. In turn, the smart card 304 can store the information into a smart card event log 309 that is managed in the memory 308 of the smart card 304. Under this approach, the smart card 304 can immediately forward the information to a wireless device 130 that is within communications range of the smart card 304 (e.g., using the communications components 318). Alternatively, when the smart card 304 is not in communications range with a wireless device 130, the smart card 304 can maintain the information in the smart card event log 309. In turn, the smart card 304 can ultimately provide the information when it enters into communications range with an eligible wireless device 130. In any case, the smart card 304 can also be configured to remove information from its memory 308 when appropriate, e.g., when the information becomes redundant, when the information has been transmitted to at least one wireless device 130, when the information becomes obsolete, and so on.

In any case, the wireless device 130 can receive and process the information provided by the smart card 304 using the same or similar techniques to those employed by the wireless device 130 when interfacing with the smart wallet 102.

Figure 3B:
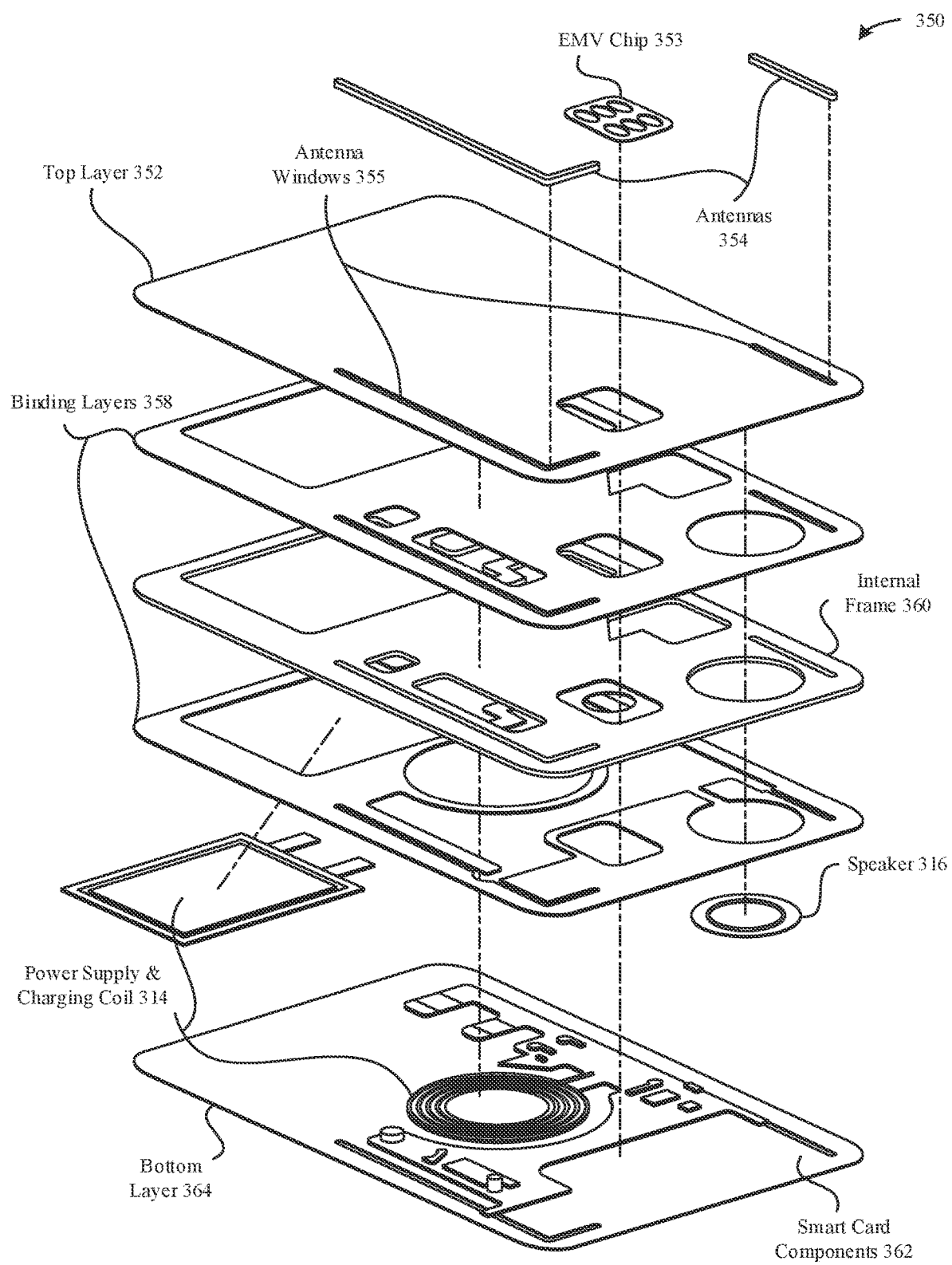
FIG. 3B illustrates a stack diagram of how different components of a smart card can be physically arranged, according to some embodiments.

FIG. 3B illustrates a stack diagram 350 of how different components of the smart card 304 can be physically arranged, according to some embodiments. As shown in FIG. 3B, the smart card 304 can include an EMV chip 353 for enabling the smart card 304 to be used to perform insertion-based payment transactions with credit card terminals. The smart card 304 can also include one or more antennas 354 that enable the smart card 304 to be used to perform contactless payment transactions with credit card terminals. For example, the one or more antennas 354 can be connected to the NFC component 310-1 described above in conjunction with FIG. 3A.

As shown in FIG. 3B, the smart card 304 can include a top layer 352 that includes antenna windows 355 that correspond to the number/shapes of the one or more antennas 354. The top layer 352 can also include a cutout into which the EMV chip 353 can be disposed. According to some embodiments, the smart card 304 can include an internal frame 360 with cutouts that accommodate the various components of the smart card 304. As shown in FIG. 3B, the internal frame 360 can be coupled to the top layer 352 and a bottom layer 364 (described below) using different binding layers 358 (e.g., adhesive layers).

As shown in FIG. 3B, the various layers can be formed to accommodate additional components of the smart card 304. For example, the layers can accommodate the power supply and charging coil 314, as well as the speaker 316. Other components of the smart card 304 that are not specifically illustrated in FIG. 3B are represented, at least in part, by the smart card components 362 included in the bottom layer 364. For example, the smart card components 362 can include the processor(s) 306, the memory 308, the NFC components 310 (e.g., the NFC component 310-2), the sensors 312, and the communications components 318. Additionally, and although not illustrated in FIG. 3B, it is noted that any number/type of materials can be included in the smart card 304 in order to eliminate problematic interference that might otherwise arise between the various components of the smart card 304 (e.g., using the same or similar interference elimination techniques discussed above in conjunction with FIG. 1C).

Accordingly, FIGS. 3A and 3B provide detailed breakdowns of how the different components of the smart card 304 can be organized in order to enable the various techniques described herein to be implemented. A more detailed breakdown of these techniques is provided below in conjunction with FIGS. 4A, 4B, 4C, 4D, and 4E.

Figure 4A:
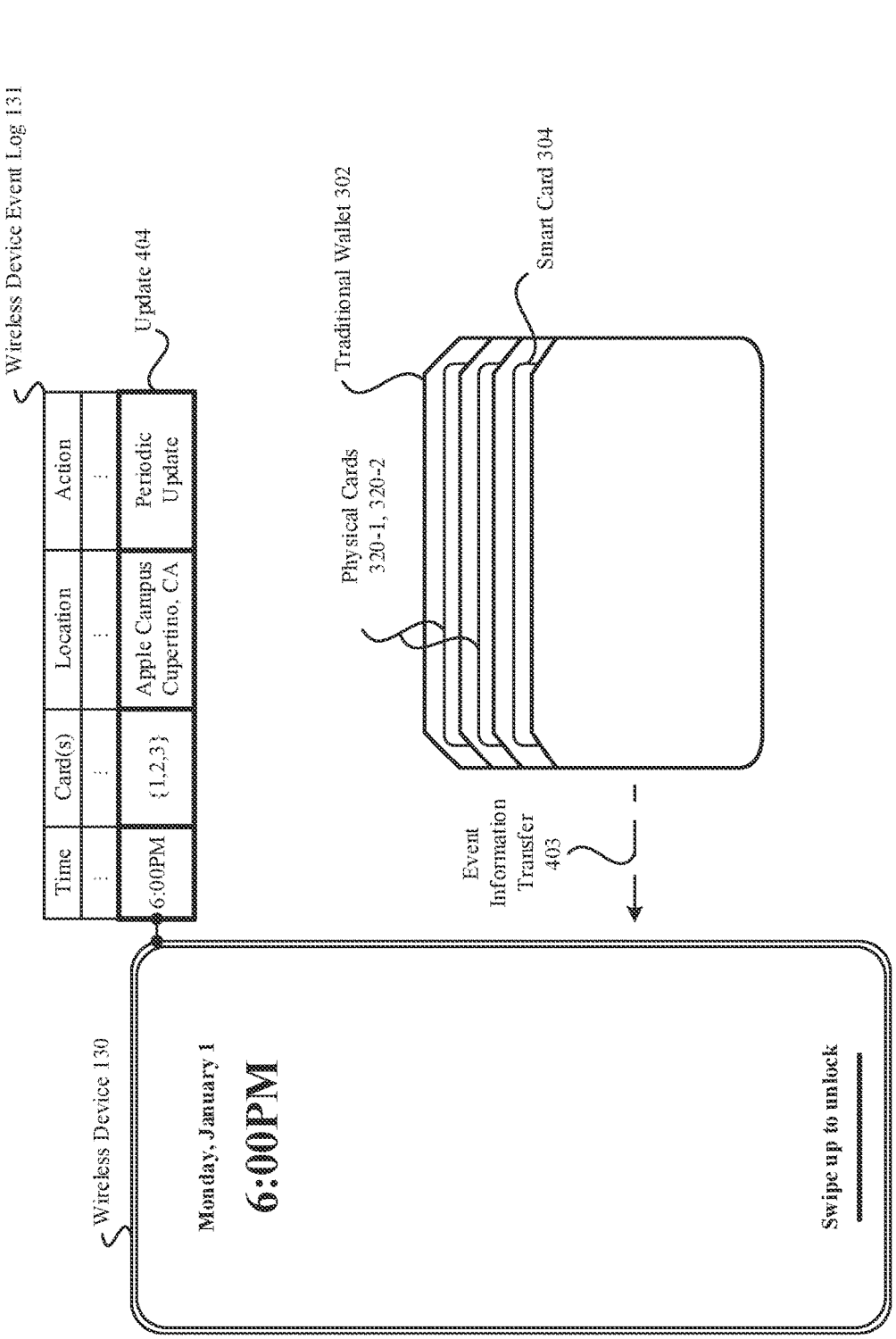
FIGS. 4A, 4B, 4C, and 4D illustrate a conceptual diagram of example interactions between a wireless device and a smart card, according to some embodiments.

FIGS. 4A, 4B, 4C, and 4D illustrate a conceptual diagram 400 of example interactions between a wireless device 130 and a smart card 304, according to some embodiments. As shown in FIG. 4A, the example scenario begins at step 402, where the smart card 304 is stored in a traditional wallet 302 that also stores two physical cards 320-1, 320-2. In the scenario illustrated in FIG. 4A, the smart card 304 is communicably coupled with the wireless device 130 using the communications components 318 (e.g., Bluetooth, UWB, Wi-Fi, etc.). As shown in FIG. 4A, step 402 involves the smart card 304 performing a periodic polling operation (e.g., using the NFC component 310-2) of the physical cards 320, if any, present in the traditional wallet 302. In turn, the smart card 304 provides its findings to the wireless device 130 via an event information transfer 403 (e.g., using the event information transfer techniques discussed above in conjunction with FIGS. 2A, 2B, 2C, 2D, and 2E). In turn, the wireless device 130 performs an update 404 to the wireless device event log 131 (e.g., using the event log update techniques also discussed above in conjunction with FIGS. 2A, 2B, 2C, 2D, and 2E).

Figure 4B:
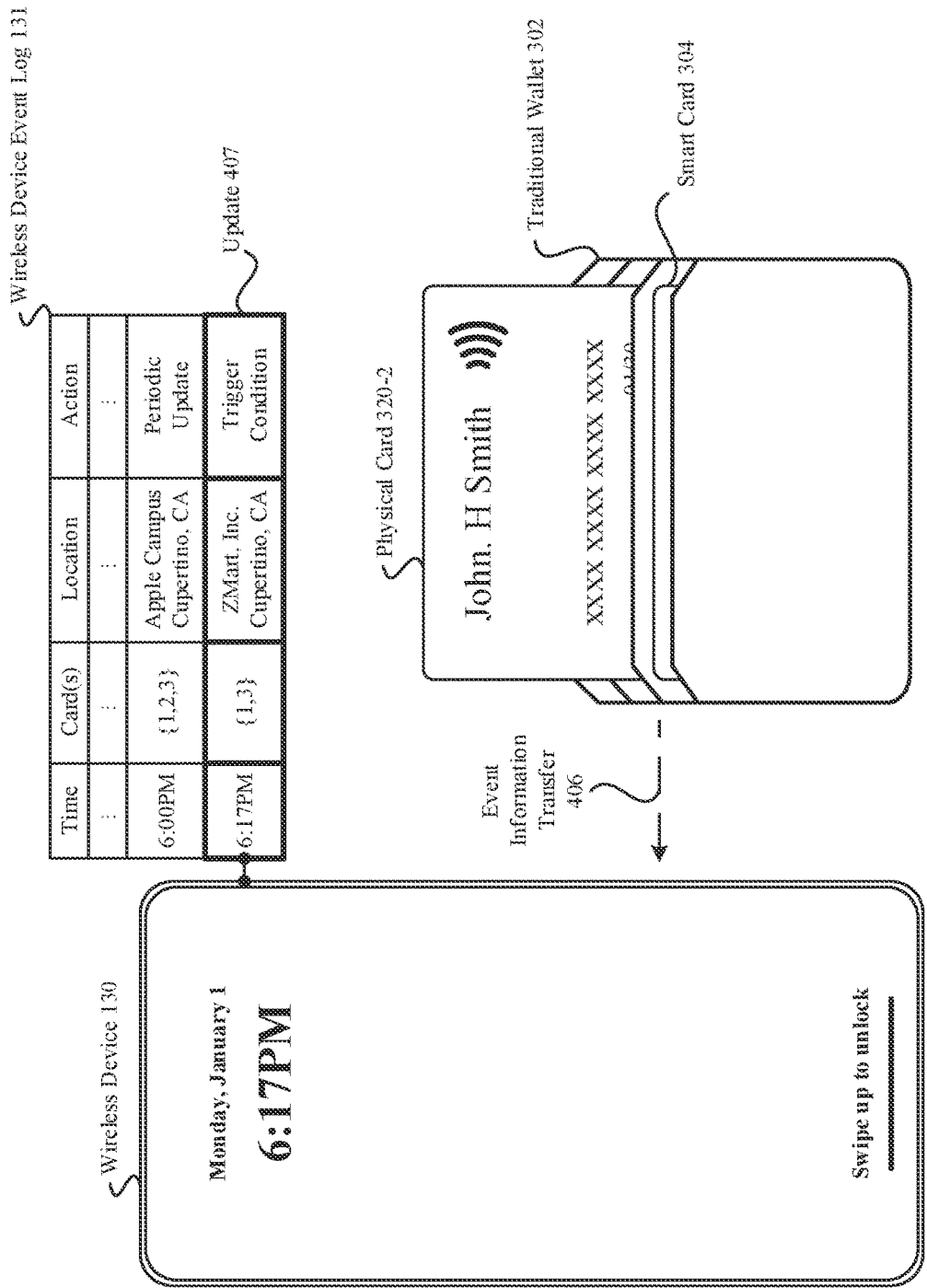

Turning now to FIG. 4B, a step 405 involves the physical card 320-2 being removed from the traditional wallet 302, which causes the smart card 304 to detect a trigger condition. In particular, the trigger condition can represent the smart card 304 identifying (e.g., using one or more of the sensors 312 (e.g., an accelerometer)) that a change may have occurred to the physical cards 320 stored in the traditional wallet 302 (in which the smart card 304 is also stored). In turn, the smart card 304 determines, via a polling operation, that the physical card 320-2 has been removed from the traditional wallet 302. The smart card 304 can then provide this information to the wireless device 130 via an event information transfer 406. In turn, the wireless device 130 can perform an update 407 to the wireless device event log 131.

Figure 4C:
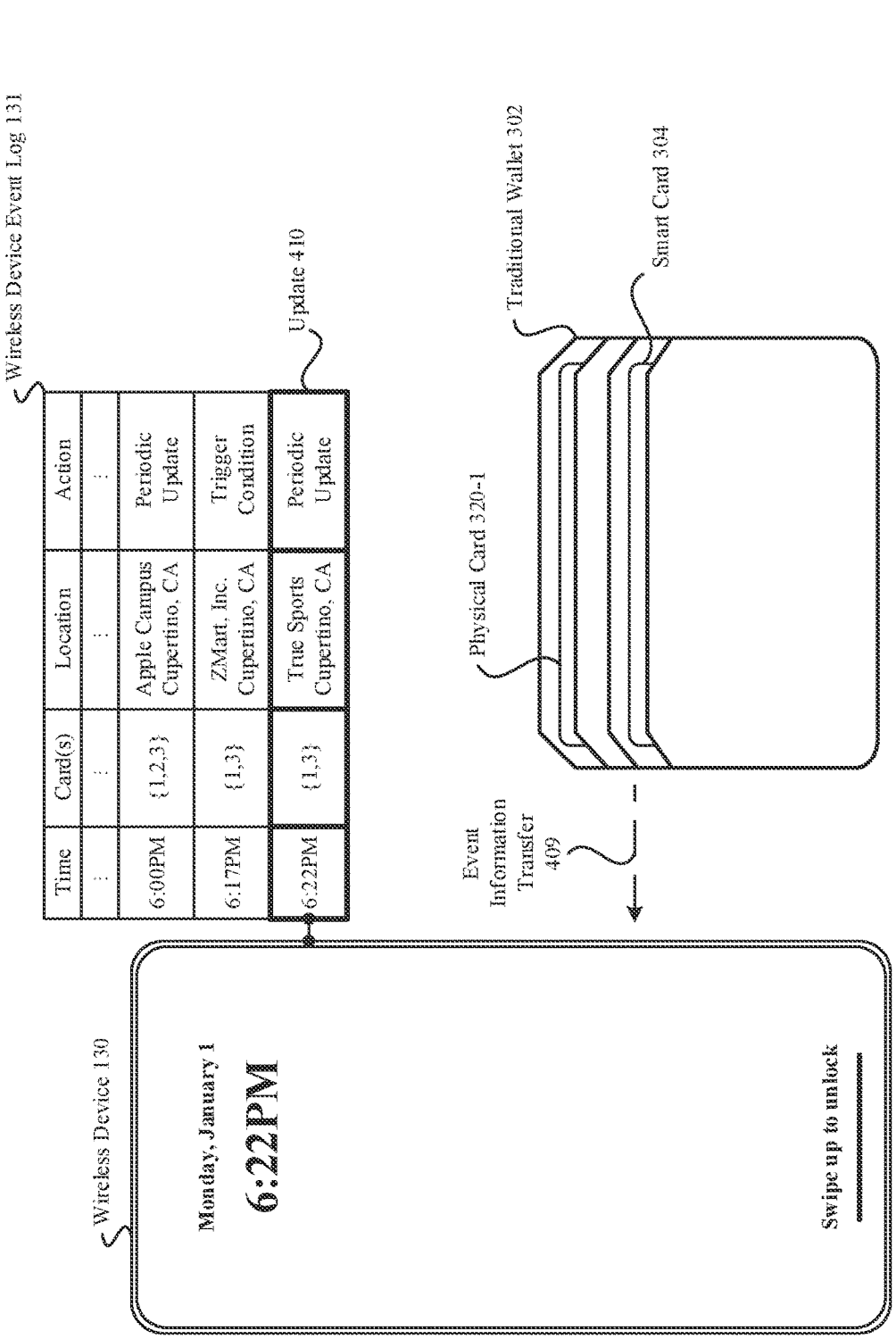

Turning now to FIG. 4C, a step 408 involves the physical card 320-2 not being returned to the traditional wallet 302 after an amount of time has passed. According to some embodiments, the smart card 304 can make this determination by performing one or more polling operations. For example, the smart card 304 can schedule a follow-up polling operation to take place based on the average amount of time it takes for an individual to place their credit card back into their wallet (after removing the credit card to perform a credit card transaction). In another example, the smart card 304 can enter into a mode in which the smart card 304 performs periodic polling operations any time a physical card 320 is not returned within a threshold period of time. It is noted that these examples are not meant to be limiting, and that the smart card 304 can implement polling operation triggers using any approach without departing from the scope of this disclosure.

In any case, step 408 involves the smart card 304 performing an event information transfer 409 in conjunction with a periodic update during which the smart card 304 identifies that the physical card 320-2 is still missing from the traditional wallet 302. In turn, the wireless device 130 can perform an update 410 to the wireless device event log 131.

Figure 4D:
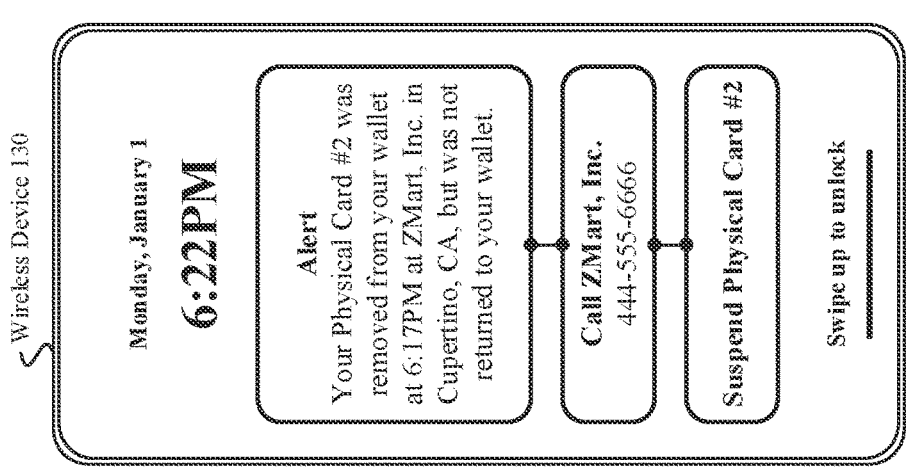

Turning now to FIG. 4D, a step 411 involves the wireless device 130 determining that a threshold amount of time has lapsed and the physical card 320-2 is still missing from the traditional wallet 302. In turn, the wireless device 130 can perform the same or similar notification/option selection techniques to those discussed above in conjunction with FIG. 2E.

Accordingly, FIGS. 4A, 4B, 4C, and 4D provide an example scenario under which the smart card 304 and the wireless device 130 interact with one another and identify a potentially problematic scenario that warrants notifying a user. A more generalized method that can be implemented by the smart card 304 is discussed below in conjunction with FIG. 4E.

Figure 4E:
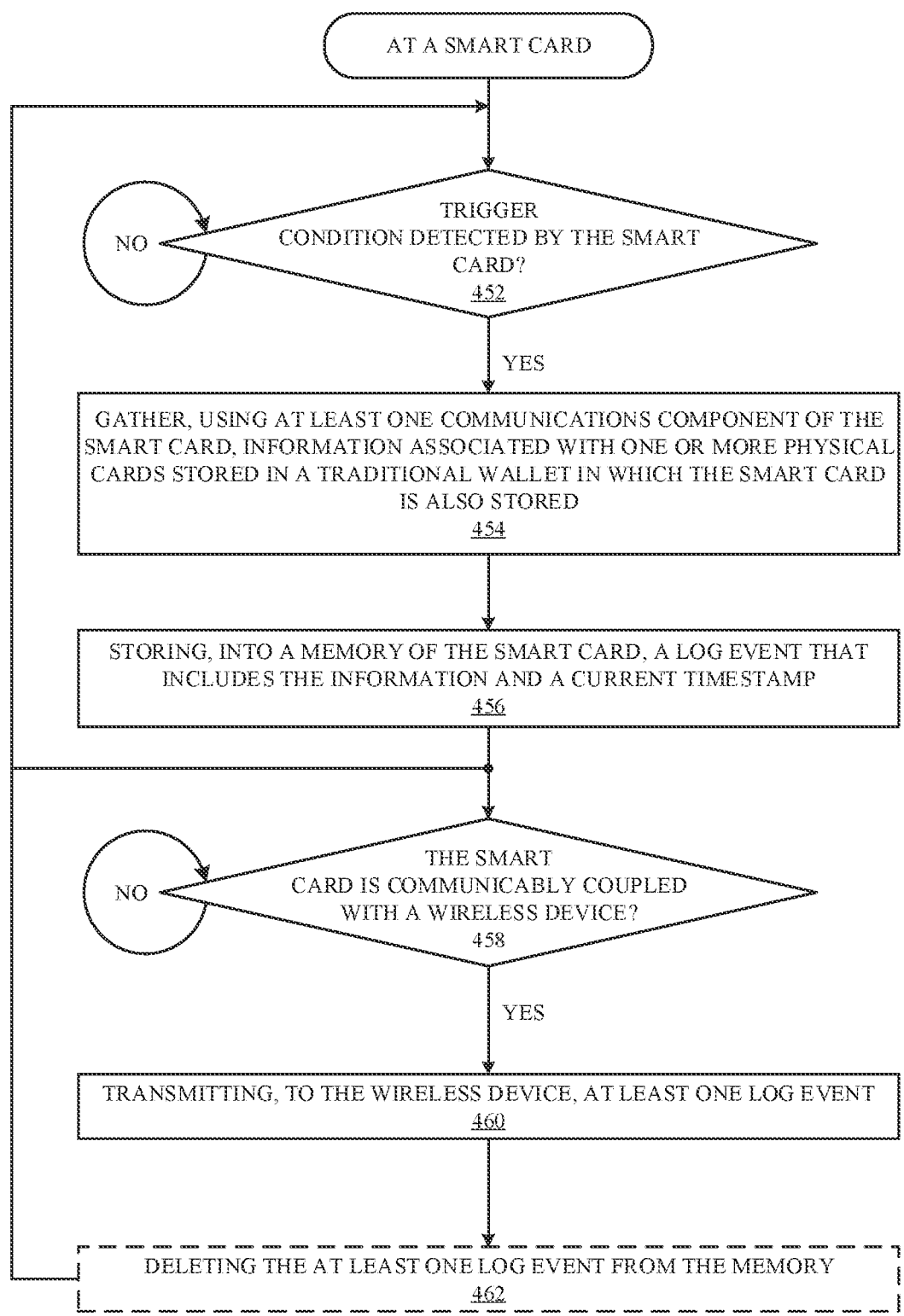
FIG. 4E illustrates a method that can be implemented by a smart card to manage physical cards stored in a traditional wallet (in which the smart card is also stored), according to some embodiments.

FIG. 4E illustrates a method 450 that can be implemented by the smart card 304 to manage (e.g., track or detect the presence or absence of) physical cards 320 stored in a traditional wallet 302 (in which the smart card 304 is also stored), according to some embodiments. As shown in FIG. 4E, the method 450 begins at step 452, where the smart card 304 determines whether a trigger condition is detected. If, at step 452, the smart card 304 determines that a trigger condition is detected, then the method 450 proceeds to step 454. Otherwise, the method repeats at step 452 until a trigger condition is detected.

At step 454, the smart card 304 gathers, using at least one communications component of the smart card (i.e., the NFC component 310-2), information about physical cards 320, if any, stored in the traditional wallet 302 (in which the smart card 304 is also stored). At step 456, the smart card 304 stores, into a memory of the smart card (i.e., smart card event log 309 stored in the memory 308), a log event that includes the information and a current timestamp.

At step 458, the smart card 304 determines whether it is communicably coupled with a wireless device 130. If, at step 458, the smart card 304 determines that it is communicably coupled with a wireless device 130, then the method 450 proceeds to step 460. Otherwise, step 458 is repeated until the smart card 304 becomes communicably coupled with a wireless device 130. It is noted that smart card 304 can also execute step 452 when additional changes to the physical cards 320 stored in the traditional wallet 302 are detected in the meantime.

At step 460, the smart card 304 transmits, to the wireless device 130, at least one log event. In some embodiments, the at least one log event is stored in the memory of the smart card 304. At optional step 462, the smart card 304 deletes the at least one log event from the memory.

Accordingly, FIGS. 3A and 3B and FIGS. 4A, 4B, 4C, 4D, and 4E set forth a smart card configured to manage (e.g., track or detect the presence or absence of) the physical cards stored in a traditional wallet (in which the smart card is also stored) and to interface with a wireless device.

Additionally, it is noted that the smart wallet 102 and/or the smart card 304 (hereinafter, the "smart device") described herein can be utilized to implement additional and useful features. For example, the smart device can be configured to, upon identifying a physical card that is unknown to the smart device, provide a notification to a wireless device 130 that is known to the smart device. In turn, the wireless device 130 can perform various steps to determine whether a virtualization of the physical card has been added to a virtual wallet that is managed by the wireless device 130. In particular, when the wireless device 130 determines that no virtualization of the physical card exists in the virtual wallet—and that the physical card can, in fact, be virtualized—then the wireless device 130 can display a user interface that permits the user conveniently create a virtualization of the physical card within the virtualized wallet. It is noted that various security measures can be implemented to thwart individuals that might otherwise attempt to exploit this feature. For example, particular aspects of the physical card—such as a person's name assigned to the physical card—can be compared against user profile information associated with the wireless device 130 to determine a likelihood that the physical card belongs to the user of the wireless device. When the likelihood satisfies a threshold, then the wireless device 130 can enable the user to engage in the virtualization process discussed above, where additional security checks may be performed (e.g., proof of banking information, proof of ownership of an email address/phone number associated with the physical card (e.g., using one-time codes), proof of a card verification value (CVV) on the physical card (to prevent close contact scanning of someone else's credit cards), etc.). alternatively, when the likelihood does not satisfy the threshold, the wireless device 130 can warn the user and take any other reasonable measures, including notifying the bank of the potentially malicious attempt to create the virtualized card. It is noted that the foregoing approaches are not meant to be limiting. Additionally, it is noted that the wireless device 130 itself can implement the foregoing approaches without requiring the smart wallet 102/the smart card 304. For example, the wireless device 130 can utilize its own NFC component (or other card reader component) to interface with physical cards in order to initiate the foregoing procedures.

Figure 5:
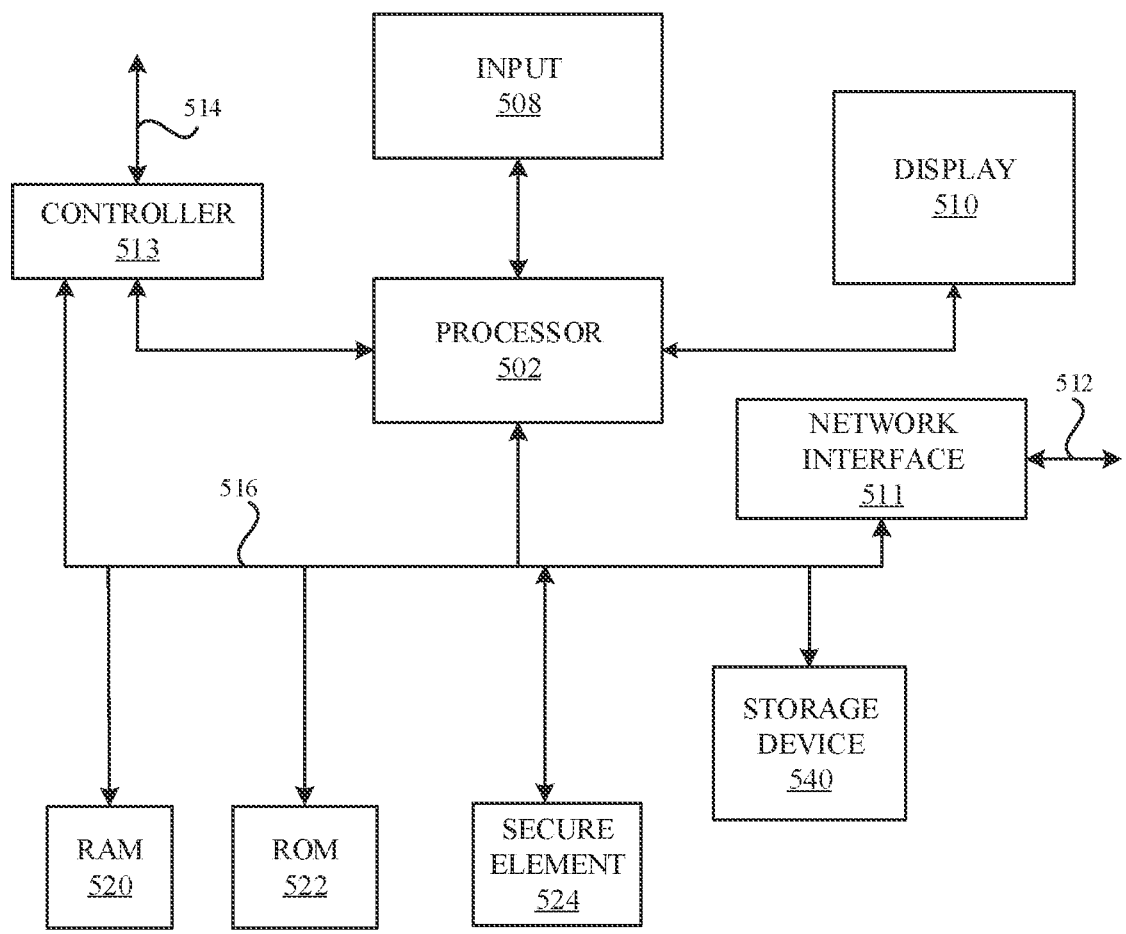
FIG. 5 illustrates a block diagram of exemplary elements of a mobile wireless device, according to some embodiments.

FIG. 5 illustrates a detailed view of a representative computing device 500 that can be used to implement various methods described herein, according to some embodiments. In particular, the detailed view illustrates various components that can be included in a smart wallet 102, a wireless device 130, a smart card 304, and the like. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that communicatively couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of the computing device 500. The computing device 500 can further include a secure element (SE) 524 for cellular wireless system access by the computing device 500.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A smart wallet configured to manage physical cards stored therein, the smart wallet comprising:
    at least one processor;
    at least one first communications component for wirelessly communicating with a wireless device;
    at least one second communications component for wirelessly identifying information associated with one or more physical cards stored in the smart wallet;
    at least one sensor for detecting a change to the one or more physical cards stored in the smart wallet, wherein the at least one sensor comprises a strain gauge that indicates a presence of the one or more physical cards stored in the smart wallet; and
    at least one memory storing instructions that, when executed by the at least one processor, cause the smart wallet to, in response to detecting the change to the one or more physical cards stored in the smart wallet:
        gather, using the at least one second communications component, information associated with the one or more physical cards stored in the smart wallet, and
        store the information as a log event in the at least one memory.

2. The smart wallet of claim 1, wherein the log event includes a timestamp associated with a time at which the change to the one or more physical cards stored in the smart wallet was detected.

3. The smart wallet of claim 1, wherein the smart wallet is further configured to:
    transmit, to the wireless device using the at least one first communications component, at least one log event.

4. The smart wallet of claim 3, wherein the at least one log event is transmitted in response to identifying that the smart wallet and the wireless device are communicably coupled by way of the at least one first communications component.

5. The smart wallet of claim 3, wherein the smart wallet is further configured to, subsequent to transmitting the at least one log event:
   delete, from the at least one memory, the at least one log event.

6. The smart wallet of claim 1, wherein the at least one first communications component enables the smart wallet to communicate using a near-field communication (NFC), a Bluetooth, and/or an ultra-wideband (UWB) protocol.

7. The smart wallet of claim 1, further comprising:
   a battery, and
   a wireless charging coil capable of wirelessly receiving energy to charge the battery.

8. The smart wallet of claim 1, further comprising:
   a battery, and
   a wireless charging coil capable of wirelessly receiving energy to charge the battery.

9. A method for managing physical cards stored in a smart wallet, the method comprising:
   detecting, by a strain gauge that indicates a presence of the one or more physical cards stored in the smart wallet, a change to the one or more physical cards stored in the smart wallet; and
   in response to detecting the change to the one or more physical cards stored in the smart wallet:
      gathering, using a first communications component of the smart wallet, information associated with the one or more physical cards stored in the smart wallet, and
      storing the information as a log event in at least one memory of the smart wallet.

10. The method of claim 1, wherein the log event includes a timestamp associated with a time at which the change to the one or more physical cards stored in the smart wallet was detected.

11. The method of claim 1, further comprising:
   transmitting, to the wireless device using at least one second communications component, at least one log event.

12. The method of claim 11, wherein the at least one log event is transmitted in response to identifying that the smart wallet and the wireless device are communicably coupled by way of the at least one second communications component.

13. The method of claim 11, further comprising, subsequent to transmitting the at least one log event:
   deleting, from the at least one memory, the at least one log event.

14. The smart wallet of claim 11, wherein the at least one second communications component enables the smart wallet to communicate using a near-field communication (NFC), a Bluetooth, and/or an ultra-wideband (UWB) protocol.

15. A non-transitory computer readable medium storing instructions for managing physical cards stored in a smart wallet, the instructions comprising:
   instructions for detecting, by a strain gauge that indicates a presence of the one or more physical cards stored in the smart wallet, a change to the one or more physical cards stored in the smart wallet; and
   instructions for, in response to detecting the change to the one or more physical cards stored in the smart wallet:
      gathering, using a first communications component of the smart wallet, information associated with the one or more physical cards stored in the smart wallet, and
      storing the information as a log event in at least one memory of the smart wallet.

16. The non-transitory computer readable medium of claim 15, wherein the log event includes a timestamp associated with a time at which the change to the one or more physical cards stored in the smart wallet was detected.

17. The non-transitory computer readable medium of claim 15, wherein the instructions further comprise:
   instructions for transmitting, to the wireless device using at least one second communications component, at least one log event.

18. The non-transitory computer readable medium of claim 17, wherein the at least one log event is transmitted in response to identifying that the smart wallet and the wireless device are communicably coupled by way of the at least one second communications component.

19. The non-transitory computer readable medium of claim 17, wherein the instructions further comprise:
   instructions for, subsequent to transmitting the at least one log event, deleting, from the at least one memory, the at least one log event.

20. The non-transitory computer readable medium of claim 17, wherein the at least one second communications component enables the smart wallet to communicate using a near-field communication (NFC), a Bluetooth, and/or an ultra-wideband (UWB) protocol.

* * * * *